(12) United States Patent
Ota et al.

(10) Patent No.: US 7,648,075 B2
(45) Date of Patent: Jan. 19, 2010

(54) DATA TRANSMISSION-RECEPTION SYSTEM, CONTACTLESS IC CHIP, MOBILE TERMINAL, INFORMATION PROCESSING METHOD, AND PROGRAM

(75) Inventors: Toyokazu Ota, Tokyo (JP); Yasumasa Nakatsugawa, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 640 days.

(21) Appl. No.: 11/434,857

(22) Filed: May 17, 2006

(65) Prior Publication Data

US 2006/0273175 A1    Dec. 7, 2006

(30) Foreign Application Priority Data

Jun. 3, 2005  (JP) ............................ P2005-163402

(51) Int. Cl.
G06K 19/06    (2006.01)
(52) U.S. Cl. ...................................... 235/492; 235/486
(58) Field of Classification Search ................. 235/492, 235/486, 487, 493, 380, 375, 382, 384, 385
See application file for complete search history.

(56) References Cited

U.S. PATENT DOCUMENTS

| 6,621,425 | B2 * | 9/2003 | Maeda ......................... 341/50 |
| 6,747,548 | B1 * | 6/2004 | Yamaguchi .............. 340/10.51 |
| 6,944,769 | B1 * | 9/2005 | Daniels et al. .............. 713/188 |
| 2002/0183094 | A1 | 12/2002 | Seita |
| 2005/0069139 | A1 * | 3/2005 | Higurashi .................... 380/284 |
| 2005/0107122 | A1 * | 5/2005 | Van Reenen et al. ........ 455/558 |
| 2005/0114619 | A1 * | 5/2005 | Matsuo et al. .............. 711/170 |
| 2008/0029609 | A1 * | 2/2008 | Ho ............................. 235/492 |

FOREIGN PATENT DOCUMENTS

| JP | 01-277948 | 11/1989 |
| JP | 2002-140664 | 5/2002 |

OTHER PUBLICATIONS

Austrian Search and Examination Report dated Jan. 11, 2008 for the corresponding Singapore Application No. 200609545-5.

* cited by examiner

Primary Examiner—Thien M Le
(74) Attorney, Agent, or Firm—Rader, Fishman & Grauer PLLC

(57) ABSTRACT

A data transmission-reception system includes a reader-writer, a first contactless IC chip being a data source, and a second contactless IC chip being a data destination, capable of communication with the first contactless IC chip via the reader-writer. The first and second contactless IC chips each have data areas of the same applications in memories built therein. The first contactless IC chip includes first generating means for performing authentication by the use of data encrypted with a key generated by combination of keys to generate a transfer key and transmitting means for encrypting data to be transferred with the transfer key and transmitting the encrypted data. The second contactless IC chip includes second generating means for performing authentication by the use of data encrypted with a key generated by combination of keys to generate a transfer key and acquiring means for acquiring the data to be transferred.

13 Claims, 19 Drawing Sheets

DATA SOURCE

DATA DESTINATION

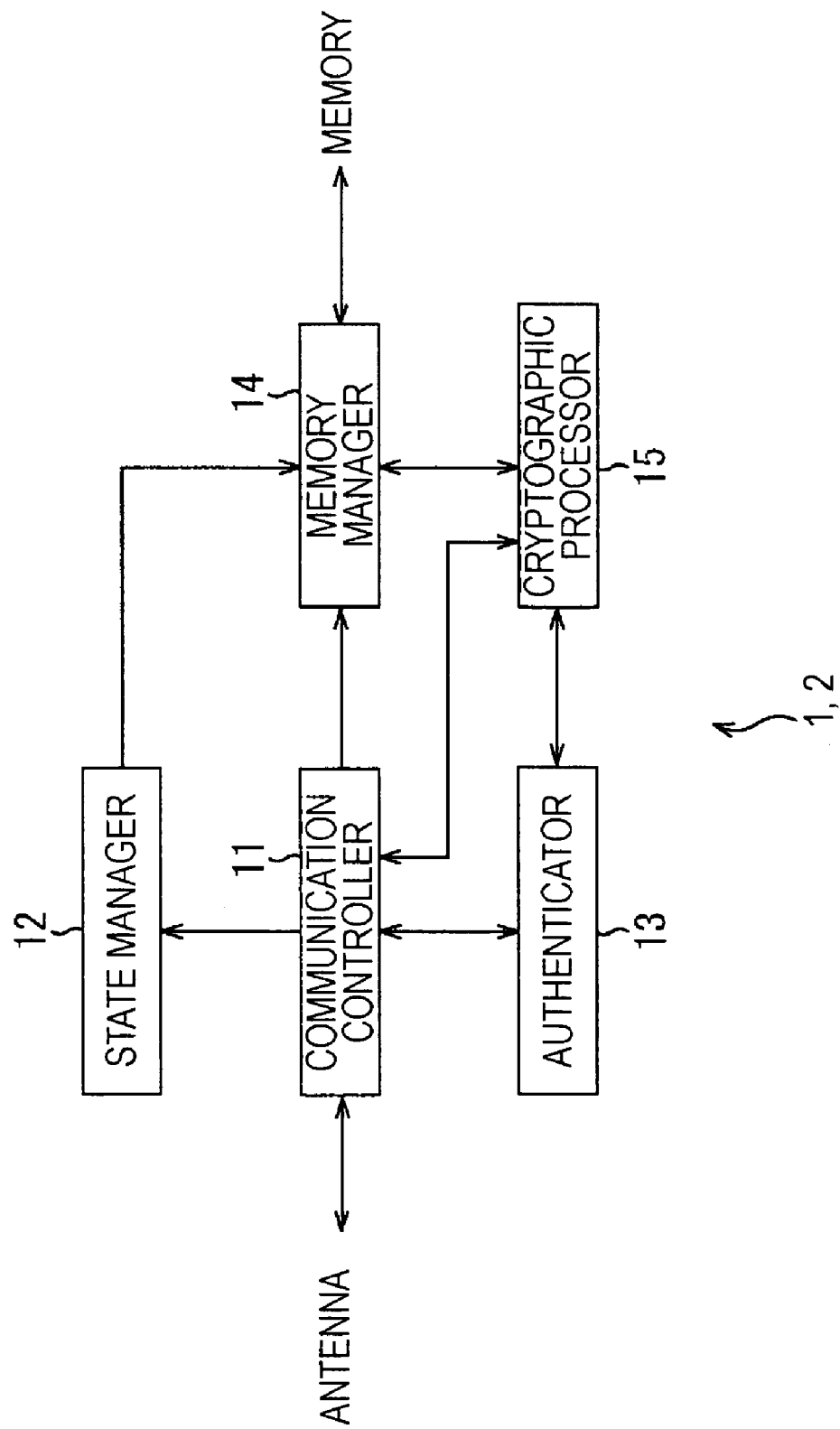

ENABLED

DISABLED

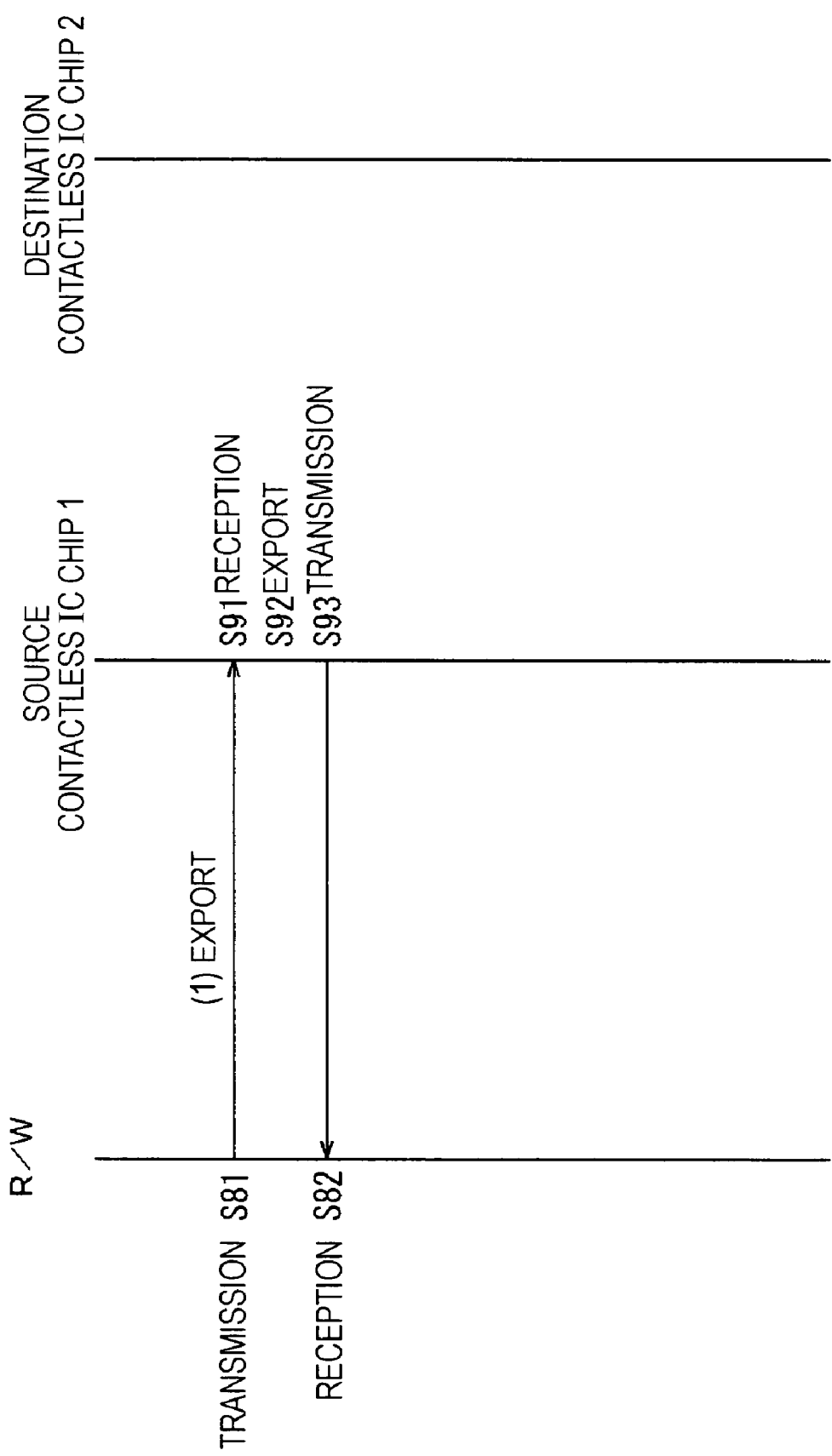

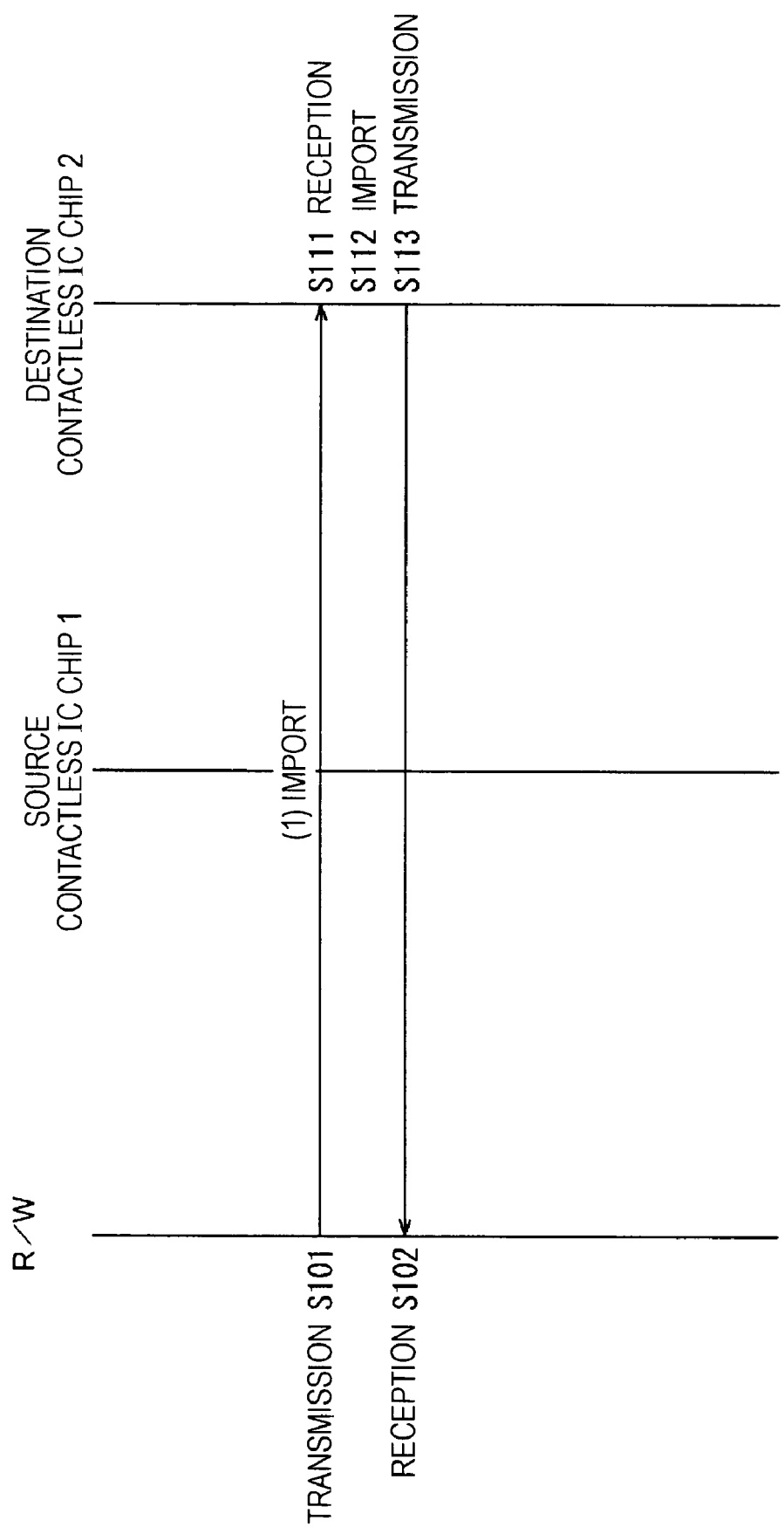

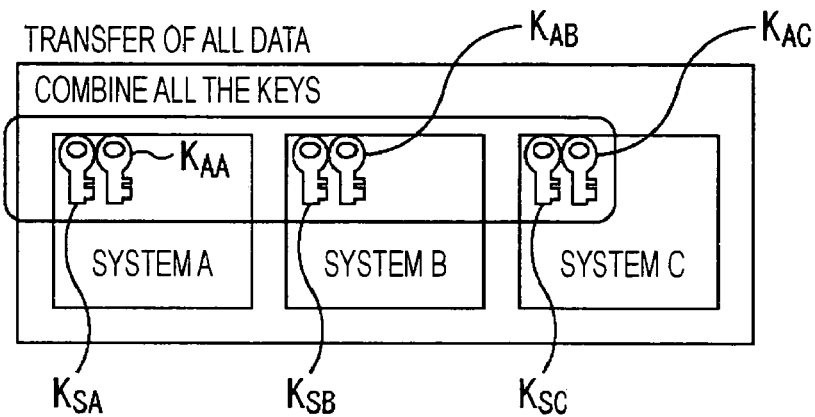
FIG. 17A
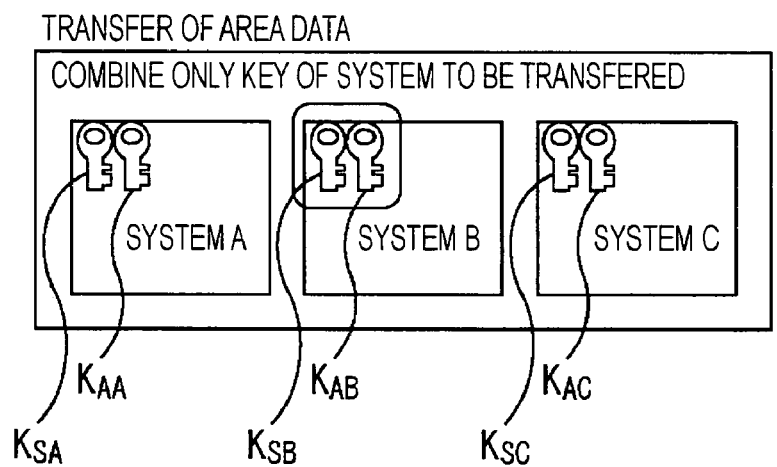
FIG. 17B

DATA TRANSMISSION-RECEPTION SYSTEM, CONTACTLESS IC CHIP, MOBILE TERMINAL, INFORMATION PROCESSING METHOD, AND PROGRAM

CROSS REFERENCES TO RELATED APPLICATIONS

The present invention contains subject matter related to Japanese Patent Application JP 2005-163402 filed in the Japanese Patent Office on Jun. 3, 2005, the entire contents of which are incorporated herein by reference.

BACKGROUND OF THE INVENTION

1. Field of the Invention

The present invention relates to data transmission-reception systems, contactless integrated circuit (IC) chips, mobile terminals, information processing methods, and a programs. More particularly, the present invention relates to a data transmission-reception system, a contactless IC chip, a mobile terminal, an information processing method, and a program, which are capable of safely and easily transferring data stored in a predetermined area in a data source to a data destination.

2. Description of the Related Art

Mounting of contactless IC chips, such as Felica (Registered Trademark of Sony Corporation), in mobile phones acts as a trigger to make the contactless IC chips more popular in recent years. Users are capable of using mobile phones including contactless IC chips to pay for items or to hold mobile phones over reader-writers provided on ticket checkers at stations to cause the reader-writers to confirm information on the communication tickets, stored in the contactless IC chips.

As the contactless IC chips have become popular, it becomes necessary to provide means for transferring data stored in a certain contactless IC chip to another contactless IC chip. For example, in change of the models of mobile phones to other models, it is necessary to transfer information concerning electronic money or communication tickets, stored in the contactless IC chips that are mounted in the old mobile phones, to the contactless IC chips mounted in the new mobile phones.

Methods of transferring data stored in a contactless IC chip are disclosed in, for example, Japanese Unexamined Patent Application Publication No. 2002-140664.

SUMMARY OF THE INVENTION

It is necessary to keep the confidentiality of data to be transferred from a contactless IC chip to another contactless IC chip and, therefore, to prevent the data from being reproduced in contactless IC chips other than the destination contactless IC chip. It is also necessary to prevent the data from being analyzed by a malicious person.

It is preferable that such transfer be easily performed, while preventing the malicious reproduction or analysis, only for data within a predetermined range, that is, only for data to be transferred, among the entire data stored in the contactless IC chip.

It is desirable to safely and easily transfer data stored in a predetermined area.

In this specification, the term "contactless IC chip" means a semiconductor integrated circuit device that at least implements an IC card function and that includes a wireless interface. The term "contactless IC chip" represents an IC chip installed in data communication devices, such as IC cards, cellular phones, and personal digital assistants (PDAs).

According to an embodiment of the present invention, a data transmission-reception system includes a reader-writer, a first contactless IC chip as a data source, and a second contactless IC chip as a data destination. The first contactless IC chip is capable of communication with the second contactless IC chip via the reader-writer. The first and second contactless IC chips each have data areas having the same applications in memories built therein.

The data areas having the same applications mean areas in which the same kind of data is stored and in and from which the data is written and read in response to the same command transmitted from the reader-writer. For example, when passing through of tickets gates at stations is managed with the first and second contactless IC chips, an area having information (such as identification information) concerning the ticket gate passed through, among the areas formed in the first contactless IC chip, and an area having information concerning the ticket gate passed through, among the areas formed in the second contactless IC chip, are refereed to as the data areas having the same applications. The data areas include systems and areas, described below. When a system and an area to which the same identification information as the one allocated to a system and an area generated in the first contactless IC chip is allocated are generated in the second contactless IC chip, the systems and areas having the same identification information allocated to the first and second contactless IC chips are referred to as the data areas having the same applications.

According to this embodiment of the present invention, the first contactless IC chip includes first generating means for performing authentication with the second contactless IC chip by the use of data encrypted with a key generated by combining keys allocated to the data areas in which data to be transferred is managed to generate a transfer key used for encrypting the data to be transferred and transmitting means for encrypting the data to be transferred with the transfer key generated by the first generating means and transmitting the encrypted data to be transferred to the second contactless IC chip. According to this embodiment of the present invention, the second contactless IC chip includes second generating means for performing authentication with the first contactless IC chip by the use of data encrypted with a key generated by combining keys allocated to the data areas in which the data to be transferred is managed and which have the same applications as the data areas in the first contactless IC chip to generate a transfer key equivalent to the one generated in the first contactless IC chip and acquiring means for decrypting the data to be transferred, which is transferred from the first contactless IC chip and which is encrypted with the transfer key generated by the first generating means, with the transfer key generated by the second generating means to acquire the data to be transferred.

According to another embodiment of the present invention, a contactless IC chip that is a data source for another contactless IC chip capable of communication via a reader-writer and that has data areas, having the same applications as data areas in a memory built in the other contactless IC chip, in a memory built in the contactless IC chip includes generating means for performing authentication with the other contactless IC chip by the use of data encrypted with a key generated by combining keys allocated to the data areas in which data to be transferred is managed to generate a transfer key used for encrypting the data to be transferred and transmitting means for encrypting the data to be transferred with the transfer key generated by the generating means and transmitting the encrypted data to be transferred to the other contactless IC chip.

According to another embodiment of the present invention, an information processing method for a contactless IC chip that is a data source for another contactless IC chip capable of communication via a reader-writer and that has data areas, having the same applications as data areas in a memory built in the other contactless IC chip, in a memory built in the contactless IC chip includes a step of performing authentication with the other contactless IC chip by the use of data encrypted with a key generated by combining keys allocated to the data areas in which data to be transferred is managed to generate a transfer key used for encrypting the data to be transferred and a step of encrypting the data to be transferred with the generated transfer key and transmitting the encrypted data to be transferred to the other contactless IC chip.

According to another embodiment of the present invention, a program causing a computer to perform information processing for a contactless IC chip that is a data source for another contactless IC chip capable of communication via a reader-writer and that has data areas, having the same applications as data areas in a memory built in the other contactless IC chip, in a memory built in the contactless IC chip includes instructions for performing authentication with the other contactless IC chip by the use of data encrypted with a key generated by combining keys allocated to the data areas in which data to be transferred is managed to generate a transfer key used for encrypting the data to be transferred and instructions for encrypting the data to be transferred with the generated transfer key and transmitting the encrypted data to be transferred to the other contactless IC chip.

According to another embodiment of the present invention, a mobile terminal includes a contactless IC chip that is a data source for another contactless IC chip capable of communication via a reader-writer and that has data areas, having the same applications as data areas in a memory built in the other contactless IC chip, in a memory built in the contactless IC chip. The contactless IC chip includes generating means for performing authentication with the other contactless IC chip by the use of data encrypted with a key generated by combining keys allocated to the data areas in which data to be transferred is managed to generate a transfer key used for encrypting the data to be transferred and transmitting means for encrypting the data to be transferred with the generated transfer key and transmitting the encrypted data to be transferred to the other contactless IC chip.

The generating means may select all the systems formed in the built-in memory as the data areas in which the data to be transferred is managed and may use data encrypted with a key generated by combining keys allocated to all the selected systems with keys allocated to predetermined areas, among lower-layer areas in the respective systems, to perform the authentication with the other contactless IC chip.

The generating means may select a predetermined system, among all the systems formed in the built-in memory, as the data area in which the data to be transferred is managed and may use data encrypted with a key generated by combining a key allocated to the selected predetermined system with a key allocated to a predetermined area, among lower-layer areas in the predetermined system, to perform the authentication with the other contactless IC chip.

According to yet another embodiment of the present invention, a contactless IC chip that is a data source for another contactless IC chip capable of communication via a reader-writer and that has data areas, having the same applications as data areas in a memory built in the other contactless IC chip, in a memory built in the contactless IC chip includes generating means for performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred and acquiring means for decrypting the encrypted data to be transferred, which is transferred from the other contactless IC chip, with the transfer key generated by the generating means to acquire the data to be transferred.

According to yet another embodiment of the present invention, an information processing method for a contactless IC chip that is a data source for another contactless IC chip capable of communication via a reader-writer and that has data areas, having the same applications as data areas in a memory built in the other contactless IC chip, in a memory built in the contactless IC chip includes a step of performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred and a step of decrypting the encrypted data to be transferred, which is transferred from the other contactless IC chip, with the generated transfer key to acquire the data to be transferred.

According to yet another embodiment of the present invention, a program causing a computer to perform information processing for a contactless IC chip that is a data source for another contactless IC chip capable of communication via a reader-writer and that has data areas, having the same applications as data areas in a memory built in the other contactless IC chip, in a memory built in the contactless IC chip includes instructions for performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred and instructions for decrypting the encrypted data to be transferred, which is transferred from the other contactless IC chip, with the generated transfer key to acquire the data to be transferred.

According to yet another embodiment of the present invention, a mobile terminal includes a contactless IC chip that is a data source for another contactless IC chip capable of communication via a reader-writer and that has data areas, having the same applications as data areas in a memory built in the other contactless IC chip, in a memory built in the contactless IC chip. The contactless IC chip includes generating means for performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred and acquiring means for decrypting the encrypted data to be transferred, which is transferred from the other contactless IC chip, with the generated transfer key to acquire the data to be transferred.

According to the present invention, it is possible to safely and easily transfer data stored in a predetermined area.

BRIEF DESCRIPTION OF THE DRAWINGS

FIG. 7 is a block diagram showing an example of the functional structure of a contactless IC chip;

FIG. 14 is a flowchart showing an export process;

FIG. 15 is a flowchart showing an import process;

FIGS. 17A and 17B show examples of selection of keys;

DESCRIPTION OF THE PREFERRED EMBODIMENTS

Figure 1:
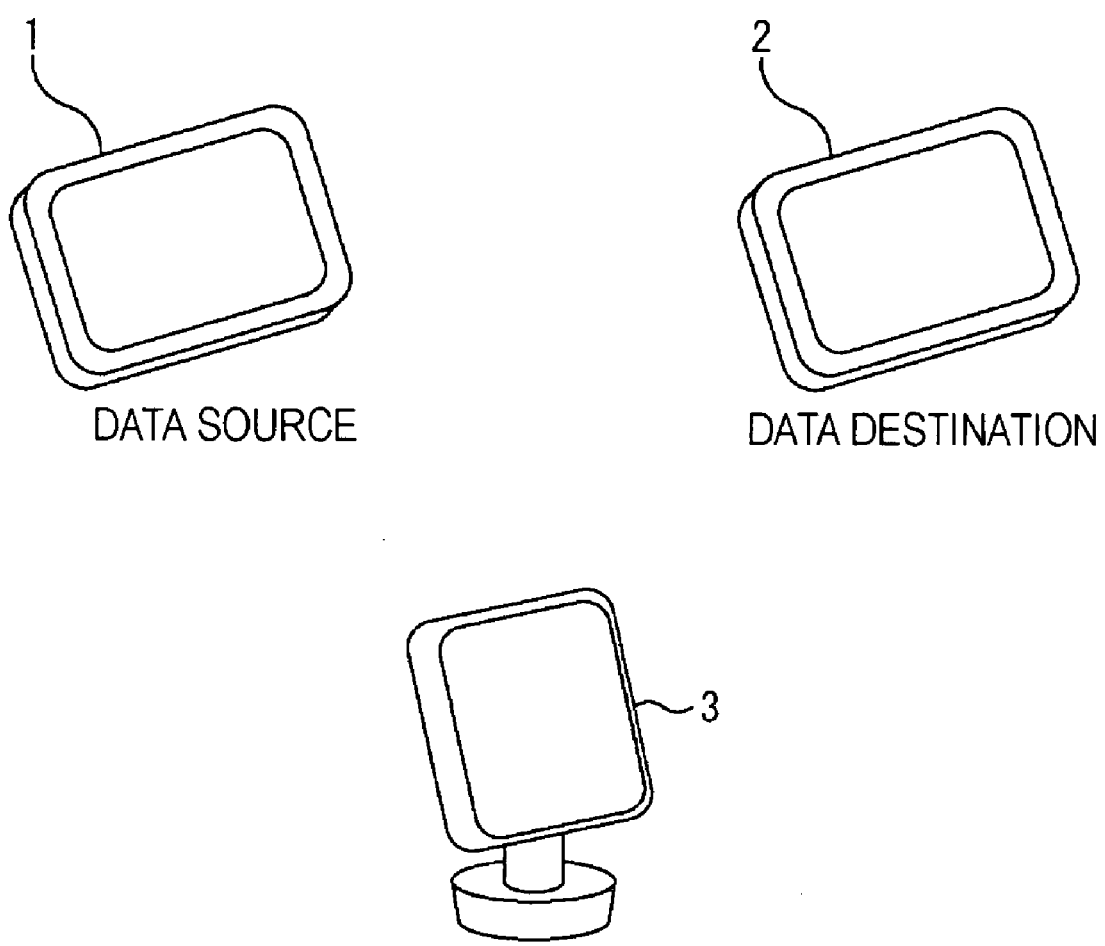
FIG. 1 shows an example of the structure of a data transmission-reception system according to an embodiment of the present invention.

Before describing embodiments of the present invention, the correspondence between the features of the claims and the specific elements disclosed in the embodiments of the present invention is discussed below. This description is intended to assure that the embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A data transmission-reception system according to an embodiment of the present invention includes a reader-writer (for example, a reader-writer 3 in FIG. 1), a first contactless IC chip (for example, a contactless IC chip 1 in FIG. 1), which is a data source, and a second contactless IC chip (for example, a contactless IC chip 2 in FIG. 1), which is a data destination and which is capable of communication with the first contactless IC chip via the reader-writer.

The first contactless IC chip includes first generating means (for example, a cryptographic processor 15 in the contactless IC chip 1, shown in FIG. 7) for performing authentication with the second contactless IC chip by the use of data (for example, a random number) encrypted with a key generated by combining keys allocated to the data areas in which data to be transferred is managed to generate a transfer key (for example, a transfer key Kt in FIG. 3) used for encrypting the data to be transferred and transmitting means (for example, a communication controller 11 in the contactless IC chip 1, shown in FIG. 7) for encrypting the data to be transferred with the transfer key generated by the first generating means and transmitting the encrypted data to be transferred to the second contactless IC chip.

The second contactless IC chip includes second generating means (for example, a cryptographic processor 15 in the contactless IC chip 2, shown in FIG. 7) for performing authentication with the first contactless IC chip by the use of data encrypted with a key generated by combining keys allocated to the data areas in which the data to be transferred is managed and which have the same applications as the data areas in the first contactless IC chip to generate a transfer key (for example, the transfer key Kt in FIG. 3) equivalent to the one generated in the first contactless IC chip and acquiring means (for example, a memory manager 14 in the contactless IC chip 2, shown in FIG. 7) for decrypting the data to be transferred, which is transferred from the first contactless IC chip and which is encrypted with the transfer key generated by the first generating means, with the transfer key generated by the second generating means, to acquire the data to be transferred.

A contactless IC chip according to another embodiment of the present invention corresponds to the first contactless IC chip in the data transmission-reception system and has the same structure as that of the first contactless IC chip.

An information processing method, according to another embodiment of the present invention, for a contactless IC chip (for example, the contactless IC chip 1 in FIG. 1) that is a data source for another contactless IC chip (for example, the contactless IC chip 2 in FIG. 1) capable of communication via a reader-writer (for example, the reader-writer 3 in FIG. 3) and that has data areas, having the same applications as data areas in a memory built in the other contactless IC chip, in a memory built in the contactless IC chip includes the step (for example, Step S21 in FIG. 12) of performing authentication with the other contactless IC chip by the use of data (for example, a random number) encrypted with a key generated by combining keys allocated to the data areas in which data to be transferred is managed to generate a transfer key (for example, the transfer key Kt in FIG. 3) used for encrypting the data to be transferred and the step (for example, Step S93 in FIG. 14) of encrypting the data to be transferred with the generated transfer key and transmitting the encrypted data to be transferred to the other contactless IC chip.

A program according to another embodiment of the present invention has instructions corresponding to the steps in the above information processing method.

A contactless IC chip, according to yet another embodiment of the present invention, corresponds to the second contactless IC chip in the data transmission-reception system and has the same structure as that of the second contactless IC chip.

An information processing method, according to yet another embodiment of the present invention, for a contactless IC chip (for example, the contactless IC chip 2 in FIG. 1) which is a data source for another contactless IC chip (for example, the contactless IC chip 1 in FIG. 1) capable of communication via a reader-writer (for example, the reader-writer 3 in FIG. 1) and which has data areas, having the same applications as data areas in a memory built in the other contactless IC chip, in a memory built in the contactless IC chip includes the step (for example, Step S41 in FIG. 12) of performing authentication with the other contactless IC chip by the use of data encrypted with a key generated by combining keys allocated to the data areas in which data to be transferred is managed and which have the same applications as the data areas in the other contactless IC chip to generate a transfer key (for example, the transfer key Kt in FIG. 3) equivalent to the one that is generated in the other contactless IC chip and that is used in the encryption of the data to be transferred and the step (for example, Step S112 in FIG. 15) of decrypting the encrypted data to be transferred, which is transferred from the other contactless IC chip, with the generated transfer key to acquire the data to be transferred.

A program according to yet another embodiment of the present invention has instructions corresponding to the steps in the above information processing method.

Embodiments of the present invention will be described with reference to the attached drawings.

FIG. 1 shows an example of the structure of a data transmission-reception system according to an embodiment of the present invention.

The data transmission-reception system includes, for example, a contactless IC chip 1 being a data source, a contactless IC chip 2 being a data destination, and a reader-writer 3.

The contactless IC chips 1 and 2 are built in mobile phones or personal digital assistants (PDAs) or are embedded in plastic cards. The contactless IC chips 1 and 2 each include an antenna that receives radio waves from the reader-writer 3, a central processing unit (CPU) driven with power that is generated in response to the received radio waves, a non-volatile memory, and so on. The contactless IC chips 1 and 2 execute commands transmitted from the reader-writer 3 and perform predetermined processing, such as reading and writing of data stored in the memory.

The reader-writer 3 performs short-distance communication with the contactless IC chips 1 and 2 by the radio waves to transmit the commands to the contactless IC chips 1 and 2 and to receive the results of the commands, transmitted from the contactless IC chips 1 and 2.

In the data transmission-reception system having the above structure, when both the contactless IC chips 1 and 2 are capable of communicating with the reader-writer 3, as shown in FIG. 1, the contactless IC chip 1 transfers data stored in a memory in the contactless IC chip 1 to the contactless IC chip 2 through the reader-writer 3.

A flow of the data transfer will now be described.

Figure 2:
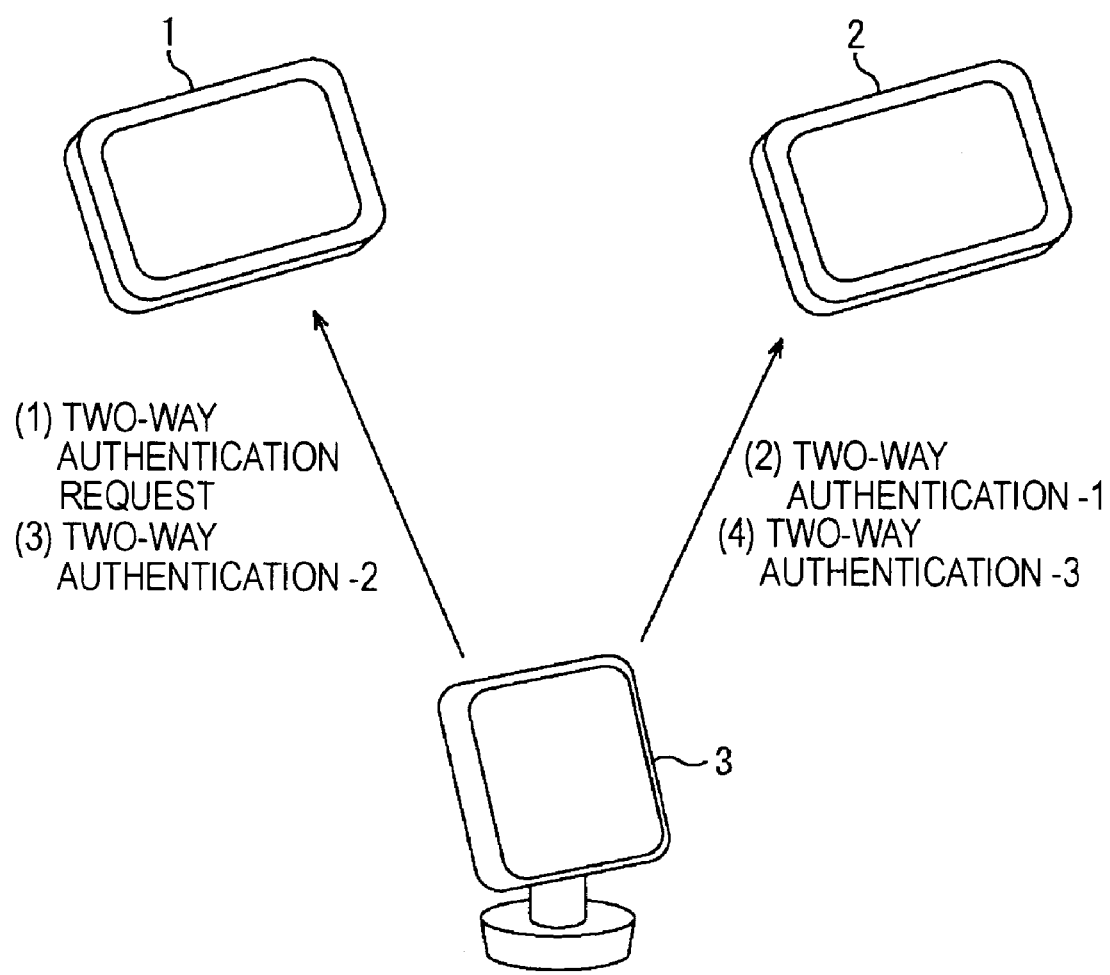
FIG. 2 illustrates two-way authentication.

FIG. 2 illustrates two-way authentication between the contactless IC chip 1 and the contactless IC chip 2. As described below, the contactless IC chips 1 and 2 are respectively provided with the same key (the contactless IC chip 2 uses the key to decrypt information encrypted by the contactless IC chip 1 while the contactless IC chip 1 uses the key to decrypt information encrypted by the contactless IC chip 2).

Referring to FIG. 2, the reader-writer 3 transmits a request for the two-way authentication with the contactless IC chip 2, which is the data destination, to the contactless IC chip 1, which is the data source. In response to this request, the contactless IC chip 1 generates a random number (random number A) having a predetermined number of digits. The contactless IC chip 1 encrypts the random number A with a key (also used as an authentication key) provided in advance and transmits the encrypted random number A to the reader-writer 3.

The encrypted random number A, transmitted from the contactless IC chip 1 to the reader-writer 3, is transmitted from the reader-writer 3 to the contactless IC chip 2 as two-way authentication 1 (data yielded in one step in a series of steps in the two-way authentication). The contactless IC chip 2 decrypts the data transmitted from the reader-writer 3 with an authentication key provided in advance and acquires the random number A generated by the contactless IC chip 1. The acquired random number A is stored in the contactless IC chip 2.

The contactless IC chip 2 also generates a random number (random number B) having a predetermined number of digits. The contactless IC chip 2 encrypts the generated random number B and the random number A, which is decrypted and acquired, with the authentication key and transmits the encrypted random numbers A and B to the reader-writer 3.

The encrypted random numbers A and B, which are transmitted from the contactless IC chip 2 to the reader-writer 3, are transmitted from the reader-writer 3 to the contactless IC chip 1 as two-way authentication 2. The contactless IC chip 1 decrypts the data transmitted from the reader-writer 3 with the authentication key to acquire the random number B generated by the contactless IC chip 2 and the random number A encrypted by the contactless IC chip 2. If the acquired random number A is confirmed as being equal to the random number A generated by the contactless IC chip 1, the random number B yielded from the decryption is stored in the contactless IC chip 1. In addition, the contactless IC chip 1 encrypts the random number B with the authentication key and transmits the encrypted random number B to the reader-writer 3.

The encrypted random number B, which is transmitted from the contactless IC chip 1 to the reader-writer 3, is transmitted from the reader-writer 3 to the contactless IC chip 2 as two-way authentication 3. The contactless IC chip 2 decrypts the data transmitted from the reader-writer 3 with the authentication key to acquire the random number B encrypted by the contactless IC chip 1. If the acquired random number B is confirmed as being equal to the random number B generated by the contactless IC chip 2, it is determined that the two-way authentication is normally completed and the two-way authentication is terminated.

After the two-way authentication is terminated, both the contactless IC chips 1 and 2 know the random numbers A and B generated by the contactless IC chips 1 and 2.

Figure 3:
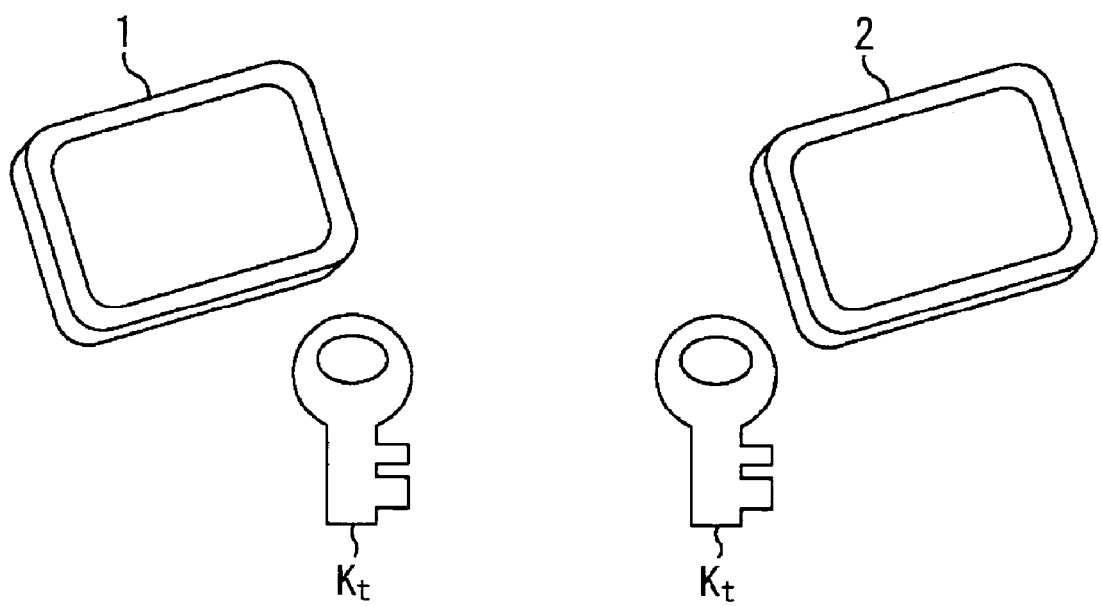
FIG. 3 illustrates sharing of a key.

FIG. 3 illustrates sharing of a key.

After the two-way authentication is terminated, a key is generated on the basis of the random numbers A and b in the contactless IC chips 1 and 2. The key serves as a transfer key Kt used for encrypting the data to be transferred in the data source while the key serves as a transfer key Kt used for decrypting the data to be transferred in the data destination. The generated transfer key Kt is known only to the contactless IC chips 1 and 2. Performing the encryption and decryption of the data to be transferred with the transfer key Kt prevents the data from being reproduced by contactless IC chips other than the contactless IC chip 1, which is the data source, and the contactless IC chip 2, which is the data destination.

Figure 4:
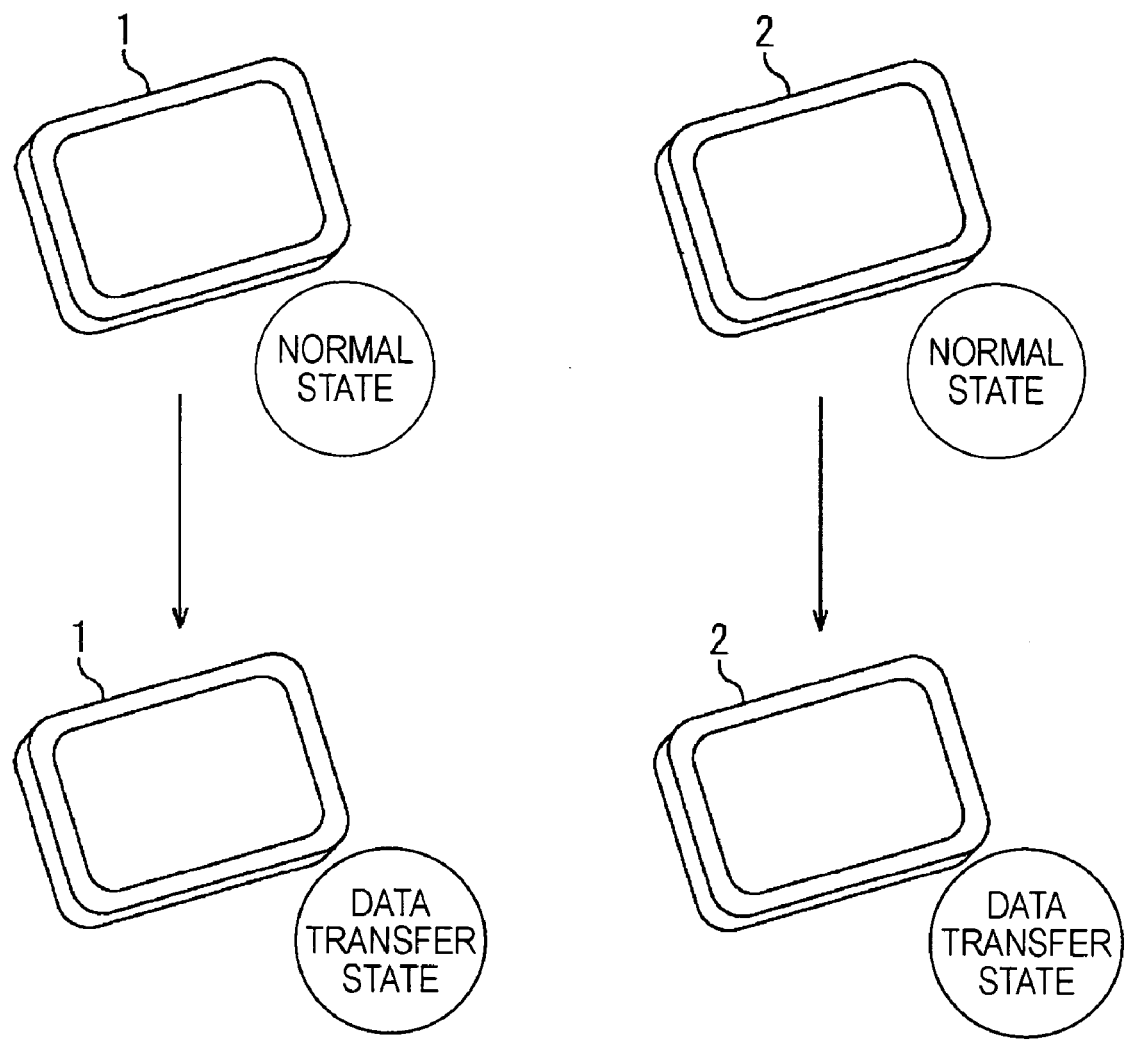
FIG. 4 illustrates state transition.

FIG. 4 illustrates state transition.

After the transfer key Kt is acquired by the contactless IC chips 1 and 2, the internal state (the state of a system, described below, in which the data to be transferred is managed) of each of the contactless IC chips 1 and 2 is switched from a normal state to a data transfer state, as shown in FIG. 4. The switching of the internal state is performed in response to, for example, a request from the reader-writer 3. The normal and data transfer states are described below. The data transfer is enabled only in the data transfer state.

Figure 5:
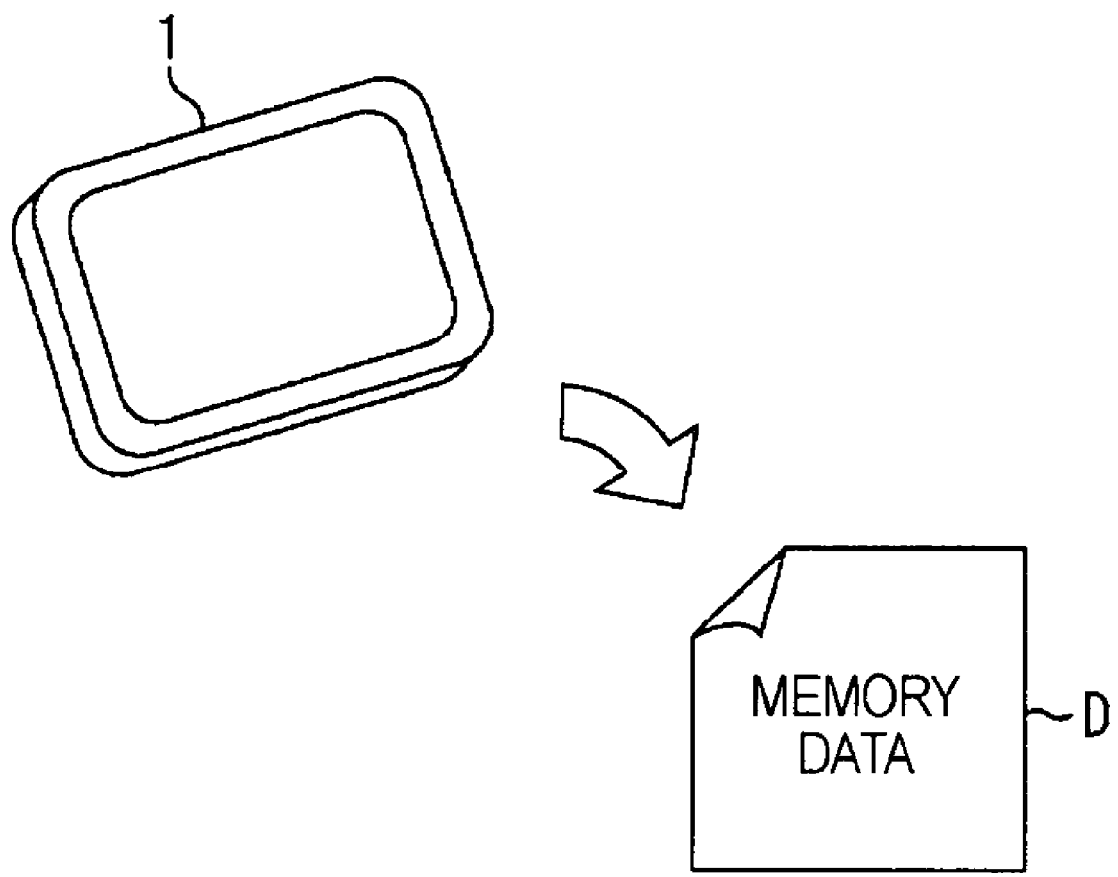
FIG. 5 illustrates export of data.

FIG. 5 illustrates export of data.

When the internal states of the contactless IC chips 1 and 2 are switched to the data transfer state, the contactless IC chip 1 being the data source reads out the data to be transferred from the memory in the contactless IC chip 1 in response to the request from the reader-writer 3. The contactless IC chip 1 encrypts the readout data and the identifier (ID) specific to the contactless IC chip 1 with a transfer key Kt to generate memory data D as the result of the export. The contactless IC chip 1 transmits the memory data D to the contactless IC chip 2 through the reader-writer 3.

Figure 6:
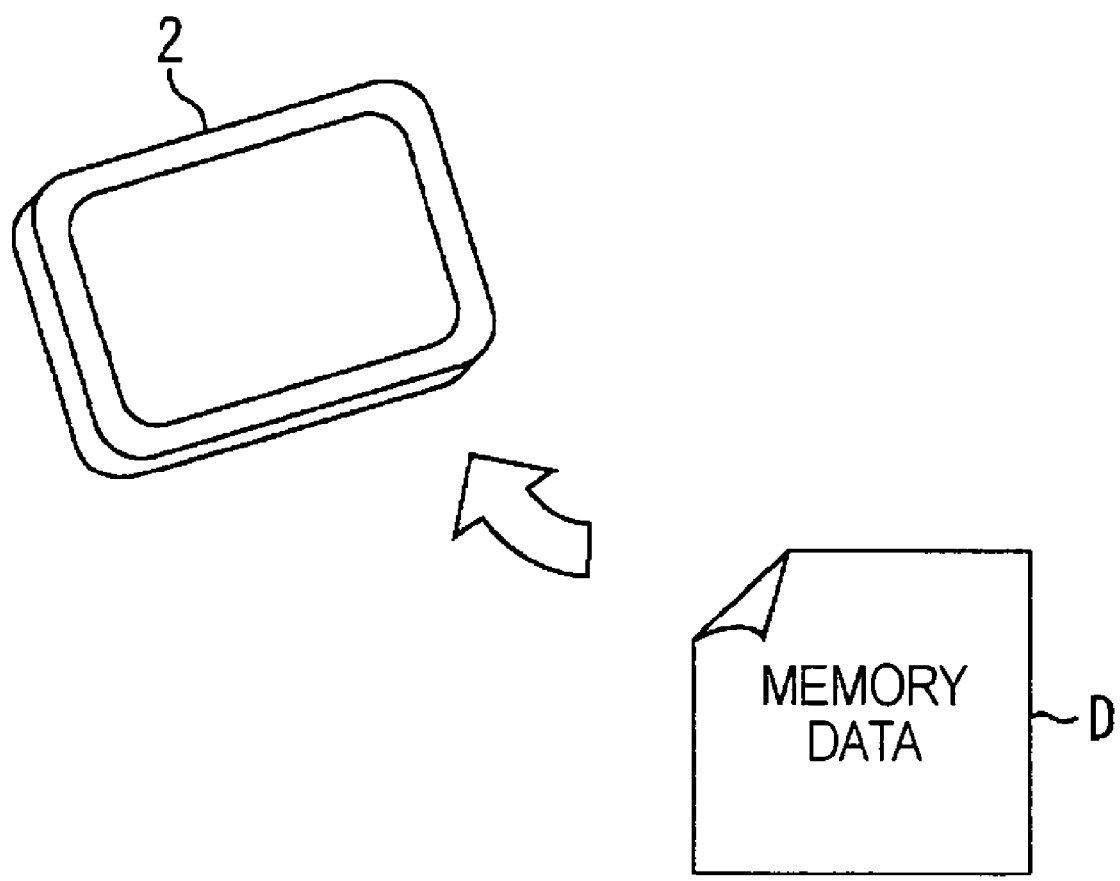
FIG. 6 illustrates import of data.

FIG. 6 illustrates import of data.

The contactless IC chip 2, which has received the memory data D exported by the contactless IC chip 1, decrypts the memory data D with the transfer key Kt to acquire the data to be transferred and the ID (the ID of the contactless IC chip 1). If the contactless IC chip 2 confirms that the decrypted and acquired ID is not identical to the ID specific to the contactless IC chip 2, the contactless IC chip 2 stores the decrypted and acquired data to be transferred in a predetermined area in the memory of the contactless IC chip 2 to realize the transfer of the data. After the data transfer is terminated, the internal state of the contactless IC chip 1 is switched to a discarded state (disabled state) at a predetermined timing while the internal state of the contactless IC chip 2 is switched to the normal state. Although the internal state of the contactless IC chip 2 being the data destination is switched to the normal state after the data transfer is terminated, the internal state of the contactless IC chip 2 may be kept in the data transfer state even after the data is transferred, if the contactless IC chip 1 being the data source is capable of performing the export any number of times, and may be switched to the discarded state when a user execute the command.

The series of steps in the contactless IC chips 1 and 2, described above, will be described below with reference to flowcharts.

FIG. 7 is a block diagram showing an example of the functional structure of the contactless IC chip 1. At least part of the functional components shown in FIG. 7 is realized by predetermined programs that are executed by the CPU in the contactless IC chip 1.

Referring to FIG. 7, a communication controller 11 controls the communication between the contactless IC chip 1 and the reader-writer 3 to supply commands transmitted from the reader-writer 3 to each component. For example, the communication controller 11 issues a command requesting the switching of the internal state to a state manger 12, issues a command requesting the export of data to a memory manager 14, and issues a command requesting the two-way authentication to a authenticator 13. In addition, the communication controller 11 transmits data etc. supplied from a cryptographic processor 15 to the reader-writer 3. For example, the encrypted random number generated in the two-way authentication and the encrypted data to be transferred, which is a result of the export, are supplied from the cryptographic processor 15 to the communication controller 11.

The state manger 12 manages the internal state of the contactless IC chip 1. For example, when a command requesting the switching of the internal state from the normal state to the data transfer state is supplied from the communication controller 11 (is transmitted from the reader-writer 3), the state manger 12 executes the command and sets a flag in the memory manager 14 (in the memory) to disable reading and writing of the data stored in the memory. When a command requesting the switching of the internal state from the data transfer state to the normal state is supplied from the communication controller 11, the state manger 12 executes the command and changes the setting of the flag to enable the reading and writing of the data stored in the memory.

Figure 8A:
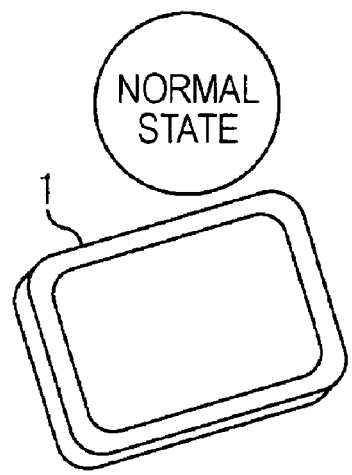
FIGS. 8A and 8B show the internal states of the contactless IC chip.
Figure 8B:
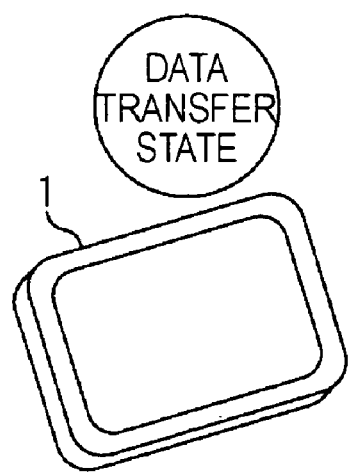

FIGS. 8A and 8B show the internal states of the contactless IC chip 1.

FIG. 8A shows the normal state. In the normal state, the reading and writing of the data stored in the memory, for example, paying for an item with electronic money, is enabled in response to an access from the external reader-writer.

FIG. 8B shows the data transfer state. In the data transfer state, only the export of the data to be transferred is enabled and the reading and writing of the data, which is enabled in the normal state, is disabled in the contactless IC chip 1 being the data source. In the contactless IC chip 2 being the data destination, only the import of the data to be transferred is enabled.

Referring back to FIG. 7, the authenticator 13 executes a command requesting start of the two-way authentication, supplied from the communication controller 11, and generates the random number A having a predetermined number of digits, used for the two-way authentication. The generated random number A is supplied to the cryptographic processor 15. When the encrypted random number, which is transmitted from the contactless IC chip 2, is decrypted in the cryptographic processor 15 and is supplied from the cryptographic processor 15 to the authenticator 13, the authenticator 13 confirms whether the random number decrypted in the cryptographic processor 15 is equal to the random number generated by the contactless IC chip 1. If the random number decrypted in the cryptographic processor 15 is equal to the random number generated by the contactless IC chip 1, the authenticator 13 indicates to the reader-writer 3 via the communication controller 11 that the random number is confirmed.

The memory manager 14 manages the data stored in the memory in accordance with the internal state managed by the state manger 12.

Areas in the memory, managed by the memory manager 14, will now be described.

Figure 9:
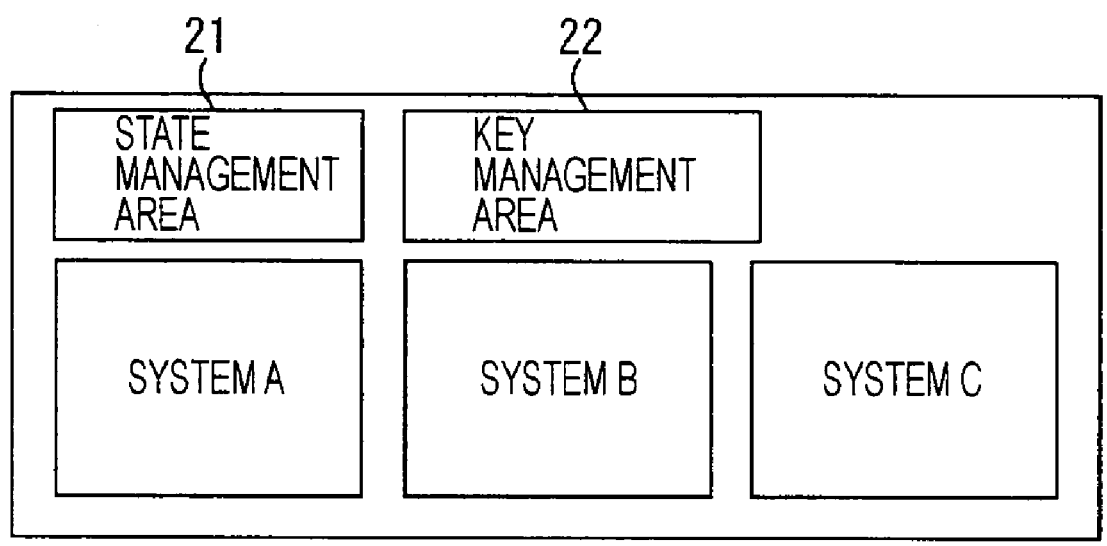
FIG. 9 shows an example of areas formed in a memory.

FIG. 9 shows an example of the areas formed in the memory.

In the example in FIG. 9, the memory has systems A to C formed therein. The "system" here means a range in which the regions of areas and services, described below, are collectively managed. For example, the system corresponds to a drive in Windows®. One or more systems are generated in the memory of the contactless IC chip 1 on the basis of a command transmitted from the reader-writer. The areas and services are hierarchically managed in each of the systems. The areas and services correspond to folders and files in Windows®.

The system formed in the memory includes definition regions, in which identification information and the system keys of the system are stored. In order to access data in a lower layer of a certain system (to read or writer data from or in a lower layer of a certain system), it is necessary to provide the same system key in the reader-writer that accesses the data, depending on the data to be accessed.

Specifically, in the example in FIG. 9, the system keys allocated to the systems A to C are stored in each of the systems A to C. The areas and services are formed in each of the systems A to C as the lower layers.

In the example in FIG. 9, a state management area 21 and a key management area 22 are formed. The state management area 21 has a flag stored therein, indicating the state (the normal state or the data transfer state, described above) of the data transfer in the systems A to C. The memory manager 14 in FIG. 7 switches the setting of the flag in the state management area 21 in accordance with the control by the state manger 12.

For example, when a flag indicating the enablement of the data transfer is set in the state management area 21, it is possible to collectively transfer the data in the systems A to C (the data managed by the systems A to C). In this case, the reading and writing of the data in the systems A to C is disabled.

The key management area 22 has the transfer key Kt generated on the basis of the random number used in the two-way authentication. The transfer key Kt stored in the key management area 22 is used when the data in the systems A to C is collectively transferred. In other words, the cryptographic processor 15 in FIG. 7 stores the transfer key Kt, generated on the basis of the random number used in the two-way authentication, in the key management area 22 via the memory manager 14 and appropriately uses the transfer key Kt for the encryption of the data to be transferred (the data in the systems A to C).

Figure 10:
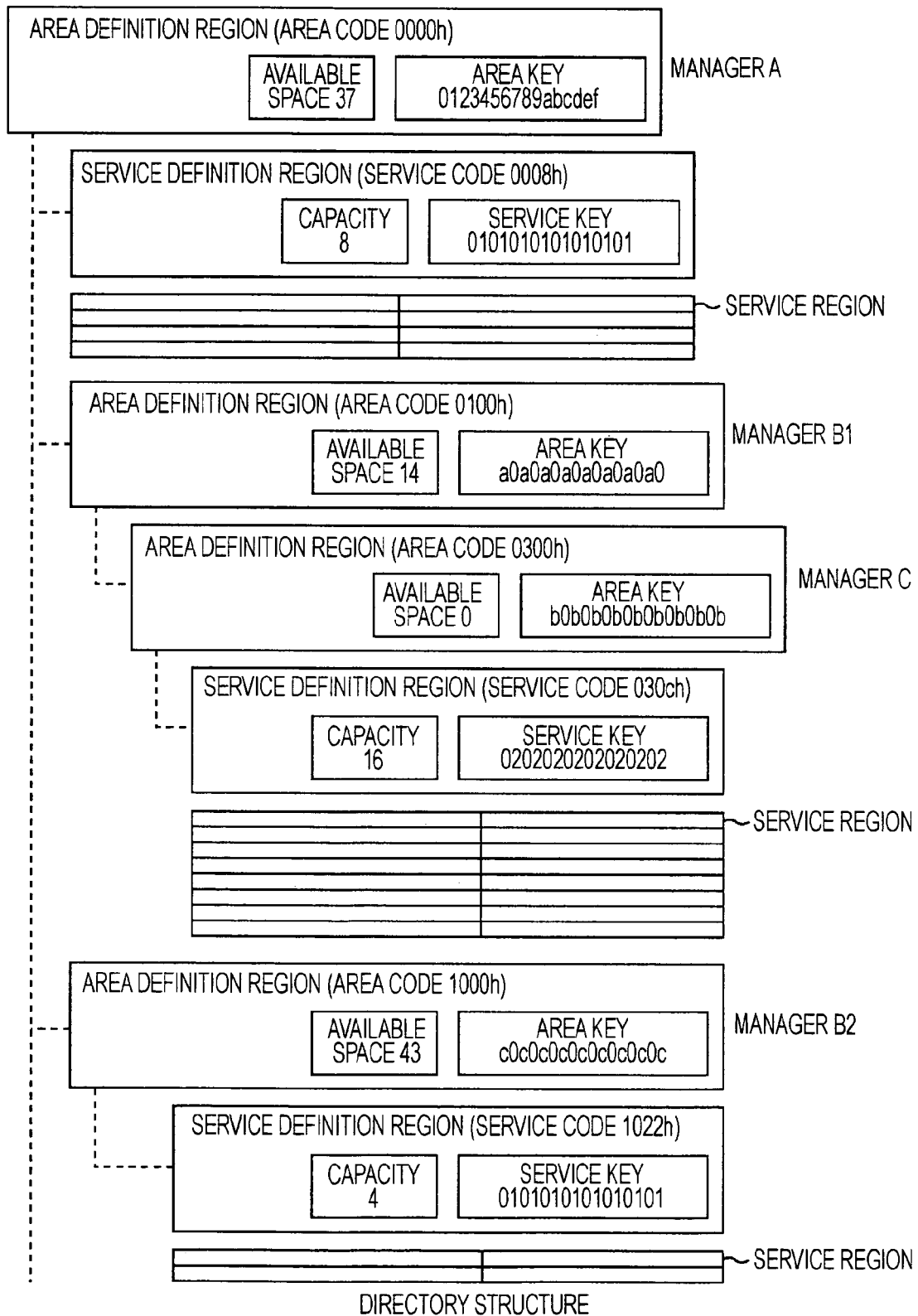
FIG. 10 shows a directory structure of areas and services.

FIG. 10 shows a directory structure of the areas and services formed in one system, such as the system A in FIG. 9.

Part of the storage area in the memory is used as a data storage area in which data used for supplying various services (meaning common services including an electronic money service and being different from the services formed in the memory) is stored. The data storage area has a hierarchical structure including area definition regions, corresponding to so-called directories, as layers. The area definition region may include the area definition regions corresponding to the directories in the lower layers and service definition regions for managing service regions, described below.

The area definition region is part of the data storage area in the memory and is allocated to a manager who manages a service provider (the manager is sometimes the service provider). The area definition region has an area code, an available space, and an area key arranged therein. The area code is an identification code used as the name for identifying the area definition region. The available space indicates the number of available free blocks. The area key is necessary for accessing the service areas, which are the lower layers of the area definition region, and so on.

In the example in FIG. 10, the area definition region having an area code "0000h", which is the top layer, is allocated to a manager A. The area definition regions for managers B1 and B2 are formed under this area definition region, which is the parent layer. The area definition region for a manager C is formed under the area definition region for the manger B1, which is the parent layer.

The service definition region is part of the data storage area in the memory and is used for managing the service region. The service definition region is allocated to a service that is provided by the service provider. The service definition region has a service code, a capacity, and a service key arranged therein. The service code is an identification code used as the name for identifying the service definition region. The capacity indicates the number of blocks in the service region in which the data necessary for providing the service is stored. The service key is necessary for accessing the service areas.

The service region is part of the data storage area and includes zero or more blocks in which the data necessary for providing the service is stored. The number of blocks in the service region indicates the capacity of the service definition region managing the service region.

The service provider creates the service definition region under the area definition region managed by a certain manager and uses the service region managed by the service definition region to provide various services. For example, in the provision of the electronic money service, the amount (balance) of the electronic money, information (for example, the name and the price) concerning an item purchased with electronic money, the date when the item is purchased, etc. are stored in the service region.

Before starting the data transfer, the contactless IC chips 1 and 2 have the same system structure (the structure of the areas having the same applications) in the respective memories. Accordingly, when the system structure in FIG. 9 is formed in the memory of the contactless IC chip 1, the systems A to C are also formed in the memory of the contactless IC chip 2. In other words, the contactless IC chips 1 and 2 each have the systems keys for the systems A to C.

Since the area keys allocated to the areas having the area code "0000h" in the systems has the same information, the contactless IC chips 1 and 2 each have the area keys of the areas, having the area code "0000h", in the systems A to C, in addition to the system keys for the systems A to C.

The key used in the two-way authentication is generated on the basis of the system keys for all the systems and the area keys of the areas, having the area code "0000h", in the respective systems. Specifically, the key used in the two-way authentication is generated by combining the system keys and the area keys. The two authentication keys are practically used in the authentication. Since the same key is generated on the basis of the same key in both the contactless IC chip 1 and the contactless IC chip 2, the contactless IC chip 2 can decrypt the data encrypted by the contactless IC chip 1 by using the generated key. Contrarily, the contactless IC chip 1 can decrypt the data encrypted by the contactless IC chip 2 by using the generated key.

Referring back to FIG. 7, the cryptographic processor 15 performs the encryption of the data, the decryption of the encrypted data, and so on. For example, when the random number generated in the two-way authentication is supplied from the authenticator 13, the cryptographic processor 15 combines the systems keys allocated to all the systems with the area keys of the areas having the area code "0000h", in the respective systems, to generate the authentication key and uses the generated authentication key to encrypt the random number. The encrypted random number is supplied to the communication controller 11.

The cryptographic processor 15 generates the transfer key Kt on the basis of the random number yielded in the two-way authentication and stores the generated transfer key Kt in the key management area 22 in the memory via the memory manager 14. When the data to be transferred is supplied from the memory manager 14, the cryptographic processor 15 uses the transfer key Kt stored in the key management area 22 to encrypt the data to be transferred and supplies the encrypted data to the communication controller 11.

The above functional components are also realized in the contactless IC chip 2. Since the components realized in the contactless IC chip 2 are basically similar to the ones in the contactless IC chip 1, a duplicated description is omitted herein.

When the encrypted data to be transferred and the ID of the contactless IC chip 1 are supplied from the communication controller 11 (are transmitted from the contactless IC chip 1 through the reader-writer 3), the cryptographic processor 15 in the contactless IC chip 2 reads out the transfer key Kt, stored in the key management area 22 in the memory, via the memory manager 14. The cryptographic processor 15 performs the decryption by the use of the readout transfer key Kt to acquire the data to be transferred and the ID. If the acquired ID is not equal to the ID of the contactless IC chip 2, the cryptographic processor 15 stores the data resulting from the decryption in the memory through the memory manager 14.

A series of data transfer processes performed between the contactless IC chips 1 and 2 each having the above structure will be described.

Figure 11:
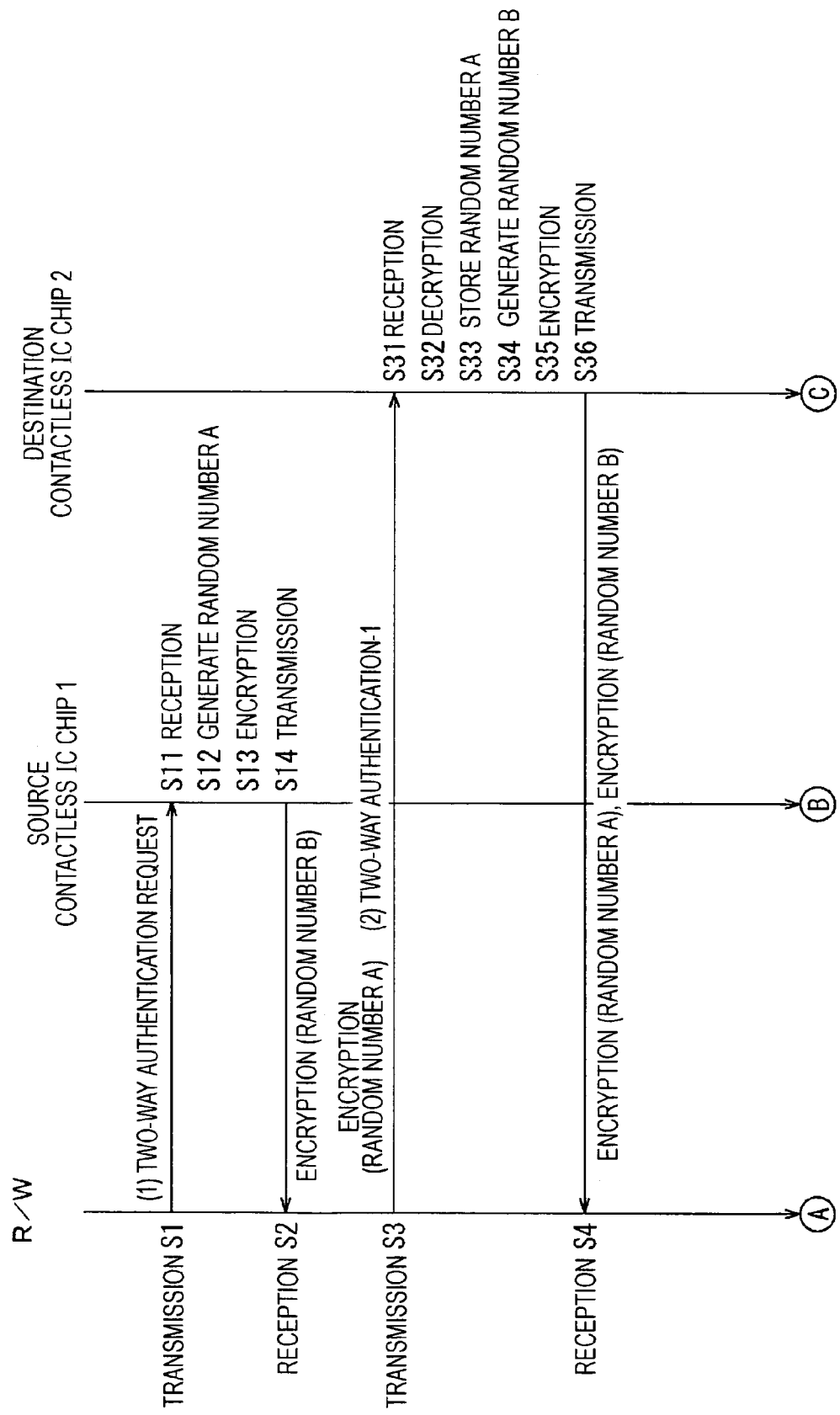
FIG. 11 is a flowchart showing a two-way authentication process.
Figure 12:
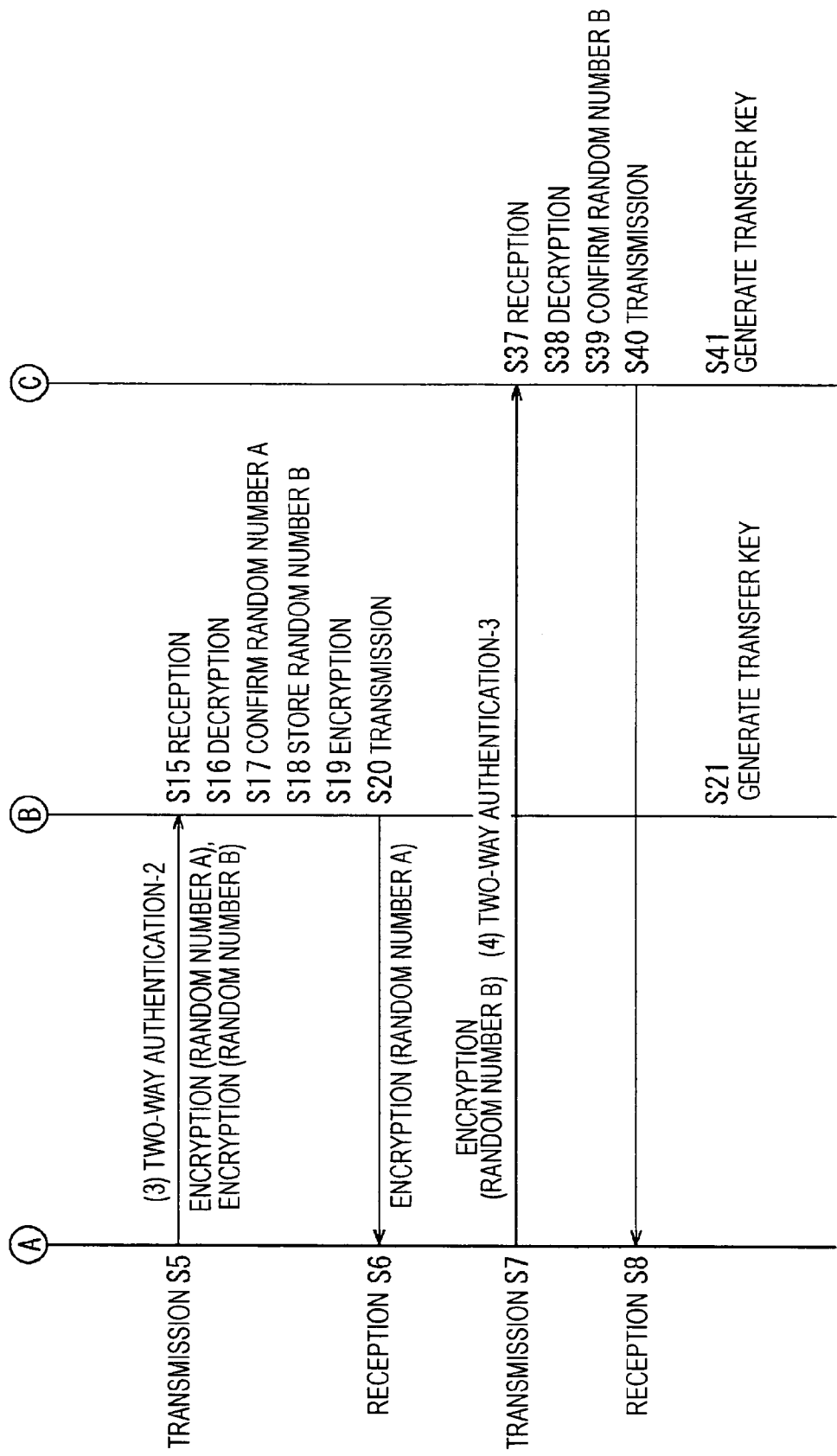
FIG. 12 is a flowchart following FIG. 11, showing the two-way authentication process.

FIGS. 11 and 12 are flowcharts illustrating the two-way authentication process. The process in FIGS. 11 and 12 corresponds to the processes described above with reference to FIGS. 2 and 3.

Referring to FIG. 11, in Step S1, the reader-writer 3 transmits a command requesting the two-way authentication with the contactless IC chip 2 being the data destination to the contactless IC chip 1 being the data source.

In Step S11, the communication controller 11 in the contactless IC chip 1 receives the command transmitted from the reader-writer 3 and supplies the received command to the authenticator 13.

In Step S12, the authenticator 13 executes the command supplied from the communication controller 11 to generate the random number A and supplies the generated random number A to the cryptographic processor 15.

In Step S13, the cryptographic processor 15 combines the system keys allocated to all the systems formed in the memory with the area keys allocated to the areas having the area code "0000h" in the systems to generate a key and uses the generated key as the authentication key for encrypting the random number A supplied from the authenticator 13. The cryptographic processor 15 uses the authentication key to encrypt the random number A and supplies the encrypted random number A to the communication controller 11.

In Step S14, the communication controller 11 transmits the encrypted random number A, supplied from the cryptographic processor 15, to the reader-writer 3.

In Step S2, the reader-writer 3 receives the data (the encrypted random number A) transmitted from the contactless IC chip 1 and proceeds to Step S3 to transmit the data to the contactless IC chip 2 (the two-way authentication 1).

In Step S31, the communication controller 11 in the contactless IC chip 2 receives the data transmitted from the reader-writer 3 and supplies the received data to the cryptographic processor 15.

In Step S32, the cryptographic processor 15 combines the system keys allocated to all the systems formed in the memory with the area keys allocated to the areas having the area code "0000h" in the systems to generate a key and uses the generated key as the authentication key. The cryptographic processor 15 uses the authentication key to decrypt the data supplied from the communication controller 11 to acquire the random number A.

After acquiring the random number A, in Step S33, the cryptographic processor 15 temporarily stores the random number A. The stored random number A is used for generating a transfer key Kt in the process described below.

In Step S34, the authenticator 13 generates the random number B and supplies the generated random number B to the cryptographic processor 15.

In Step S35, the cryptographic processor 15 encrypts the random number B generated by the authenticator 13 and the decrypted and acquired random number A with the authentication key, and supplies the encrypted random numbers A and B to the communication controller 11.

In Step S36, the communication controller 11 transmits the data (the encrypted random numbers A and B) supplied from the cryptographic processor 15 to the reader-writer 3.

In Step S4, the reader-writer 3 receives the data transmitted from the contactless IC chip 2 and proceeds to Step S5 (FIG. 12) to transmit the data to the contactless IC chip 1 (the two-way authentication 2).

Referring to FIG. 12, in Step S15, the communication controller 11 in the contactless IC chip 1 receives the data transmitted from the reader-writer 3 and supplies the received data to the cryptographic processor 15.

In Step S16, the cryptographic processor 15 decrypts the data supplied from the communication controller 11 with the authentication key to acquire the random numbers A and B. The cryptographic processor 15 supplies the acquired random numbers A and B to the authenticator 13.

In Step S17, the authenticator 13 determines whether the random number A, which is acquired by decrypting the data transmitted from the contactless IC chip 2, is equal to the random number A generated by the contactless IC chip 1 in Step S12. If the authenticator 13 determines that the random number A, which is acquired by decrypting the data transmitted from the contactless IC chip 2, is equal to the random number A generated by the contactless IC chip 1 in Step S12, the authenticator 13 indicates information concerning the determination to the cryptographic processor 15.

In Step S18, the cryptographic processor 15 temporarily stores the random number B acquired by decrypting the data transmitted from the contactless IC chip 2. The random number B stored here is also used for generating the transfer key Kt in the process described below.

In Step S19, the cryptographic processor 15 encrypts the random number B with the authentication key and supplies the encrypted random number B to the communication controller 11.

In Step S20, the communication controller 11 transmits the data (the encrypted random number B), supplied from the cryptographic processor 15, to the reader-writer 3.

In Step S6, the reader-writer 3 receives the data transmitted from the contactless IC chip 1 and proceeds to Step S7 to transmit the data to the contactless IC chip 2 (the two-way authentication 3).

In Step S37, the communication controller 11 in the contactless IC chip 2 receives the data transmitted from the reader-writer 3 and supplies the received data to the cryptographic processor 15.

In Step S38, the cryptographic processor 15 decrypts the data supplied from the communication controller 11 with the authentication key to acquire the random number B. The cryptographic processor 15 supplies the acquired random number B to the authenticator 13.

In Step S39, the authenticator 13 determines whether the random number B acquired by decrypting the data transmitted from the contactless IC chip 1 is equal to the random number B generated by the contactless IC chip 2 in Step S34. If the authenticator 13 determines that the random number B acquired by decrypting the data transmitted from the contactless IC chip 1 is equal to the random number B generated by the contactless IC chip 2 in Step S34, the authenticator 13 supplies information concerning the determination to the cryptographic processor 15.

In Step S40, the authenticator 13 transmits the information to the reader-writer 3 through the communication controller 11.

In Step S8, the reader-writer 3 receives the information transmitted from the contactless IC chip 2. It is determined that the two-way authentication is normally completed and the process is terminated.

In Step S21, the cryptographic processor 15 in the contactless IC chip 1 generates the transfer key Kt on the basis of the random number A generated by the authenticator 13 and the stored random number B, and stores the generated transfer key Kt in the key management area 22 in the memory.

Similarly, in Step S41, the cryptographic processor 15 in the contactless IC chip 2 generates the transfer key Kt on the basis of the random number B generated by the authenticator 13 and the stored random number A in the same algorithm as in the contactless IC chip 1, and stores the generated transfer key Kt in the key management area 22 in the memory.

After the two-way authentication process, both the contactless IC chip 1 being the data source and the contactless IC chip 2 being the data destination acquire the transfer key Kt, which is known only to the contactless IC chips 1 and 2 (refer to FIG. 3).

Figure 13:
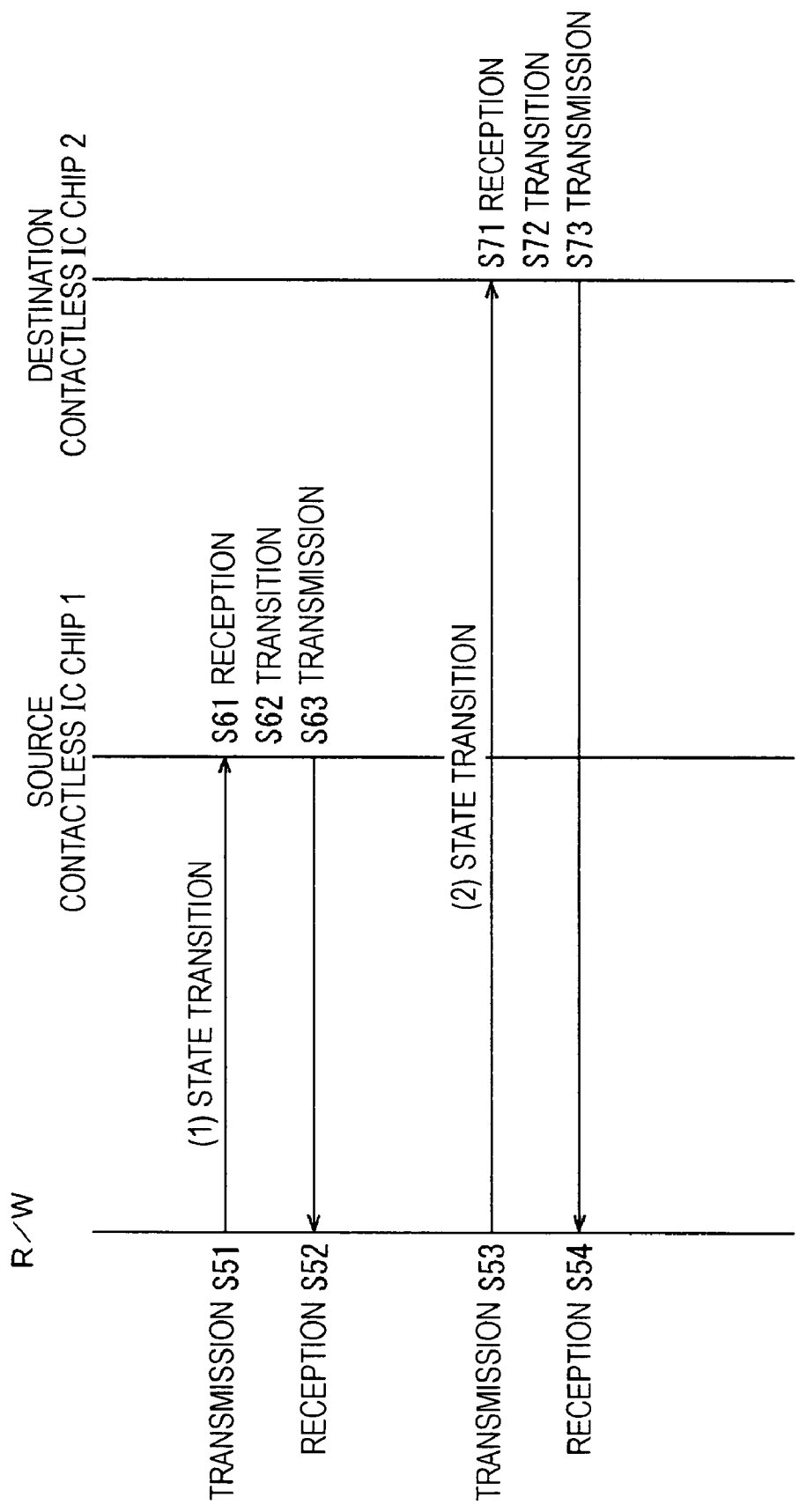
FIG. 13 is a flowchart showing a state transition process.

FIG. 13 is a flowchart showing the state transition process. This process follows the two-way authentication process shown in FIGS. 11 and 12 and corresponds to the process described above with reference to FIG. 4.

Referring to FIG. 13, in Step S51, the reader-writer 3 transmits a command requesting the switching of the internal state (the state of the system) from the normal state to the data transfer state to the contactless IC chip 1.

In Step S61, the communication controller 11 in the contactless IC chip 1 receives the command transmitted from the reader-writer 3 and supplies the received command to the state manger 12.

In Step S62, the state manger 12 executes the command supplied from the communication controller 11 and sets a flag indicating that the internal state is the data transfer state in the state management area 21 in the memory to switch the internal state from the normal state to the data transfer state.

In Step S63, the state manger 12 transmits information indicating that the internal state is switched to the reader-writer 3 through the communication controller 11 and terminates the process in the contactless IC chip 1.

In Step S52, the reader-writer 3 receives the information transmitted from the contactless IC chip 1. In Step S53, the reader-writer. 3 transmits a command requesting the switching of the internal state (the state of the system) from the normal state to the data transfer state to the contactless IC chip 2.

In Step S71, the communication controller 11 in the contactless IC chip 2 receives the command transmitted from the reader-writer 3 and supplies the received command to the state manger 12.

In Step S72, the state manger 12 executes the command supplied from the communication controller 11 and sets a flag indicating that the internal state is the data transfer state in the state management area 21 in the memory to switch the internal state from the normal state to the data transfer state.

In Step S73, the state manger 12 transmits information indicating that the internal state is switched to the reader-writer 3 through the communication controller 11 and terminates the process in the contactless IC chip 2. In Step S54, the reader-writer 3 receives the information transmitted from the contactless IC chip 2.

FIG. 14 is a flowchart showing the export process. This process follows the state transition process shown in FIG. 13 and corresponds to the process described above with reference to FIG. 5.

Referring to FIG. 14, in Step S81, the reader-writer 3 transmits, to the contactless IC chip 1, a command requesting the export of the data to be transferred.

In Step S91, the communication controller 11 in the contactless IC chip 1 receives the command transmitted from the reader-writer 3 and supplies the received command to the memory manager 14.

In Step S92, the memory manager 14 executes the command supplied from the communication controller 11 to read out the transfer key Kt stored in the state management area 21 in the memory, in addition to the data concerning all the systems, which is the data to be transferred. The memory manager 14 supplies the readout data to the cryptographic processor 15 to cause the cryptographic processor 15 to encrypt the data to be transferred with the transfer key Kt. The cryptographic processor 15 encrypts the ID of the contactless IC chip 1, in addition to the data to be transferred, with the transfer key Kt. The memory data D resulting from the encryption in the cryptographic processor 15 is supplied to the communication controller 11.

In Step S93, the communication controller 11 transmits the memory data D supplied from the cryptographic processor 15 to the reader-writer 3 and terminates the process in the contactless IC chip 1.

In Step S82, the reader-writer 3 receives the memory data D transmitted from the communication controller 11 in the contactless IC chip 1.

FIG. 15 is a flowchart showing the import process. This process follows the state transition process shown in FIG. 14 and corresponds to the process described above with reference to FIG. 6.

Referring to FIG. 15, in Step S101, the reader-writer 3 transmits a command requesting the import of the data, in addition to the memory data D transmitted from the contactless IC chip 1, to the contactless IC chip 2.

In Step S111, the communication controller 11 in the contactless IC chip 2 receives the memory data D and command, transmitted from the reader-writer 3, and supplies the received memory data D and command to the cryptographic processor 15.

In Step S112, the cryptographic processor 15 reads out the transfer key Kt, stored in the state management area 21 in the memory, through the memory manager 14 and decrypts the memory data D with the readout transfer key Kt to acquire the data to be transferred from the memory data D. The cryptographic processor 15 compares the ID of the contactless IC chip 1, acquired by decrypting the memory data D, with the ID of the contactless IC chip 2. Only if the ID of the contactless IC chip 1, acquired by decrypting the memory data D, is not identical to the ID of the contactless IC chip 2, the cryptographic processor 15 stores the decrypted and acquired data in the memory through the memory manager 14.

Confirming the IDs in the above manner prevents the data to be transferred, transmitted from a contactless IC chip, from being stored in the memory of the contactless IC chip without being transferred to another contactless IC chip. In other words, the confirmation of the IDs prevents a contactless IC chip from being set as both the data source and the data destination.

In the contactless IC chip 2, the decrypted and acquired data is stored in the system equivalent to the system serving as the data source in the contactless IC chip 1. Accordingly, for example, the data stored in the systems A to C in the contactless IC chip 1 is collectively transferred to the systems A to C in the contactless IC chip 2.

Referring back to FIG. 15, in Step S113, the cryptographic processor 15 transmits information indicating that the import is completed to the reader-writer 3 through the communication controller 11 and terminates the process. In Step S102, the reader-writer 3 receives the information transmitted from the cryptographic processor 15 in the contactless IC chip 2.

Figure 16A:
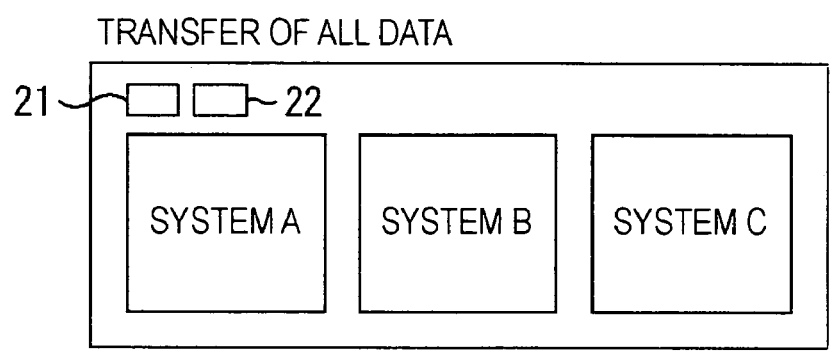
FIGS. 16A and 16B show examples of the areas formed in the memory.

As shown in FIG. 16A (FIG. 9), one state management area 21 in which the flags indicating the states of the data transfer in all the systems A to C are managed and one key management area 22 in which the movement key used in the transfer of the data stored in the systems A to C is managed are provided in the memory in order to collectively transfer the entire data in the systems A to C, which are all the systems formed in the memory. However, the state management area 21 and the key management area 22 may be provided for every system and the data transfer may be performed for every system.

Figure 16B:
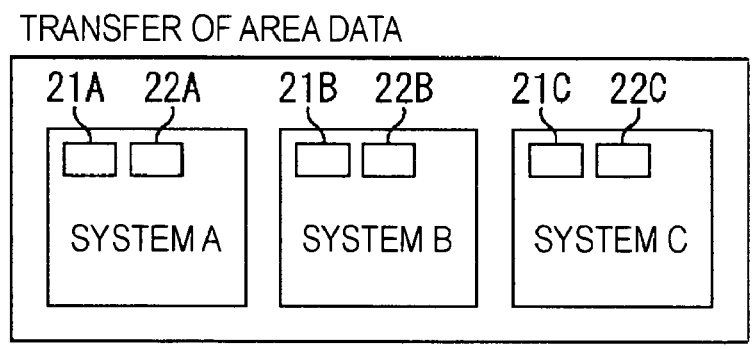

FIG. 16B shows an example of areas formed in the memory when the data transfer is performed for every system.

In the example in FIG. 16B, the system A includes a state management area 21A in which the flag indicating the state of the data transfer in the system A is managed and a key management area 22A in which the movement key used in the transfer of the data stored in the system A is managed. Similarly, the system B includes a state management areas 21B in which the flag indicating the state of the data transfer is managed and a key management area 22B in which the movement key used in the transfer of the data is managed, and the system C includes a state management areas 21C in which the flag indicating the state of the data transfer is managed and a key management area 22C in which the movement key used in the transfer of the data is managed.

For example, when only the data stored in the system A is to be transferred, the flag indicating the internal state is the data transfer state is set only in the state management area 21A while the flag indicating the internal state is the normal state is set in the state management areas 21B in the system B and in the state management area 21C in the system C. Reading and reading of the data from and in the systems B and C is enabled.

FIGS. 17A and 17B show examples of selection of the keys used in the two-way authentication.

As described above, when the data in the systems A to C is collectively transferred, as shown by a solid box in FIG. 17A, the authentication key is generated on the basis of system keys $K_{SA}$, $K_{SB}$, and $K_{SC}$ of the systems A to C and area keys $K_{AA}$, $K_{AB}$, and $K_{AC}$ of the areas, having the area code "0000h", in the systems A to C. In contrast, when the data is to be transferred for every system, for example, when the data only in the system B is to be transferred, as shown by a solid box in FIG. 17B, the authentication key is generated on the basis of the system key $K_{SB}$ of the system B and the area key $K_{AB}$ of the area, having the area code "0000h", in the system B.

Figure 18:
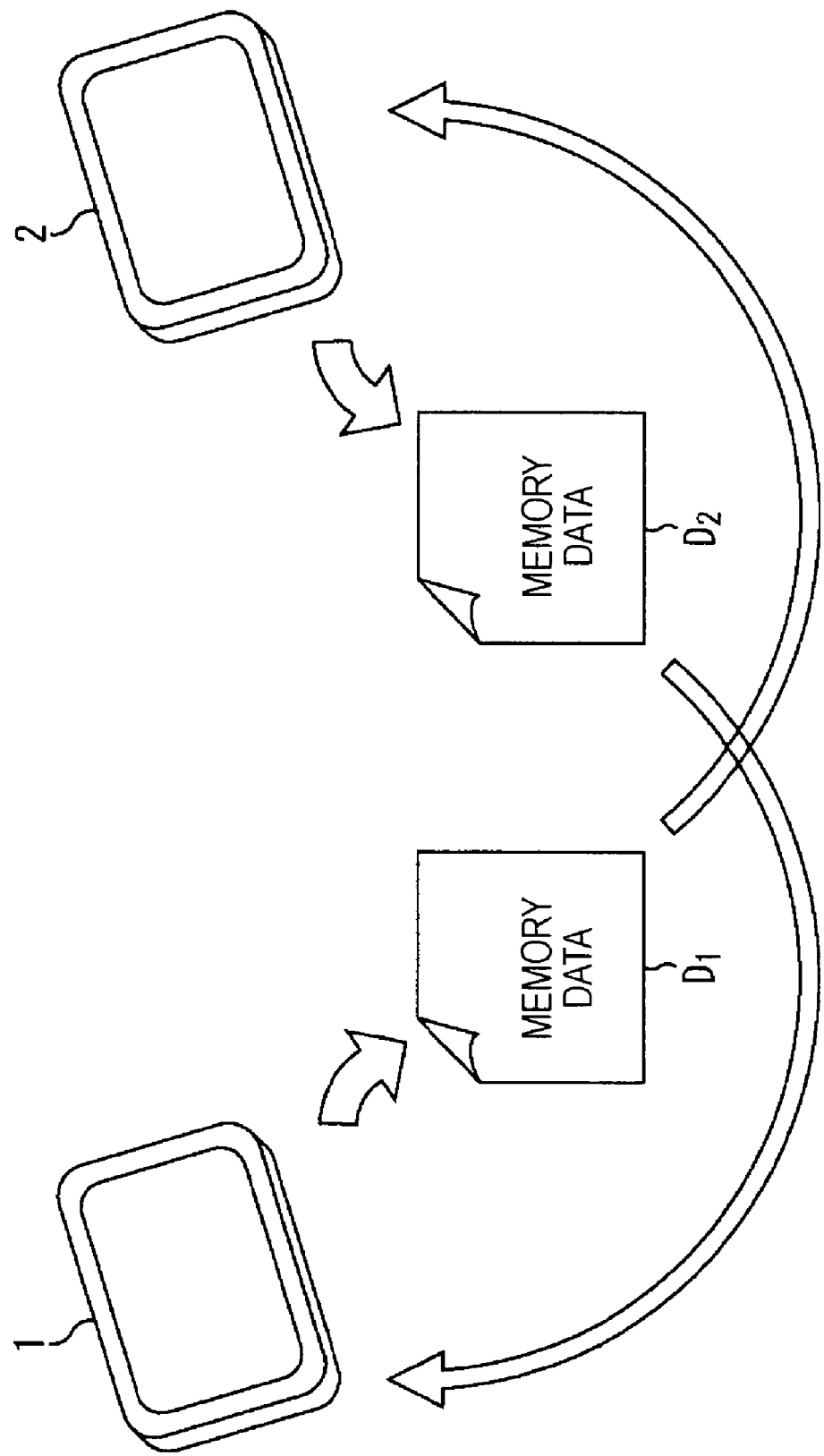
FIG. 18 illustrates data exchange.

Although the case in which the data in a certain system is transferred from the contactless IC chip 1 to the contactless IC chip 2 is described above, the data in the same system may be transferred from the contactless IC chip 2 to the contactless IC chip 1 to perform data exchange, as shown in FIG. 18.

In this case, for example, memory data $D_1$ exported from the contactless IC chip 1 is imported into the contactless IC chip 2 to realize the data transfer from the contactless IC chip 1 to the contactless IC chip 2. Then, memory data $D_2$ exported from the contactless IC chip 2 is imported into the contactless IC chip 1 by using the transfer key Kt again, which has been used in the data transfer from the contactless IC chip 1 to the contactless IC chip 2, to realize the data transfer from the contactless IC chip 2 to the contactless IC chip 1, whereby realizing the data exchange.

Although the contactless IC chips 1 and 2 are made close to one reader-writer 3 to perform the data transfer or the data exchange by the communication via the reader-writer 3 in the above description, the contactless IC chip 1 and the contactless IC chip 2 may be made close to separate reader-writers, connected to each other via a predetermined path, to perform the data transfer or the data exchange by the communication via the reader-writers.

The above processes may be performed by hardware or may be performed by software. When the processes are performed by software, for example, a personal computer shown in FIG. 19 executes the software.

Figure 19:
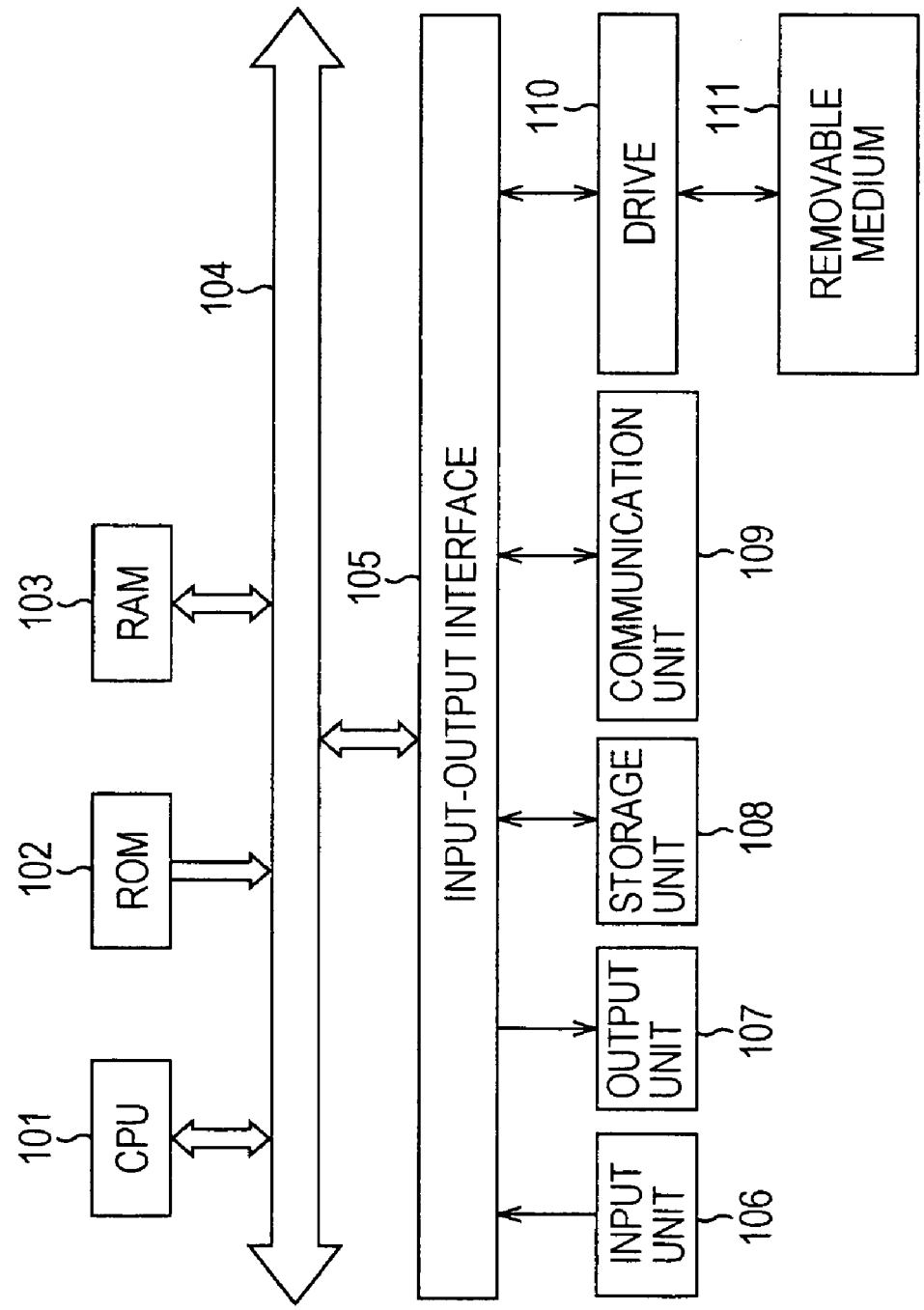
FIG. 19 is a block diagram showing an example of the structure of a personal computer.

Referring to FIG. 19, a CPU 101 performs various processes in accordance with programs stored in a read only memory (ROM) 102 or programs loaded from a storage unit 108 into a random access memory (RAM) 103. The RAM 103 includes data used by the CPU 101 for performing the various processes.

The CPU 101, the ROM 102, and the RAM 103 are connected to each other via a bus 104. An input-output interface 105 is also connected to the bus 104.

An input unit 106 including a keyboard and a mouse; an output unit 107 including a display, such as a liquid crystal display (LCD), a speaker, and so on; the storage unit 108, for example, a hard disk; and a communication unit 109 performing the communication over a network are connected to the input-output interface 105.

A drive 110 is connected to the input-output interface 105, if necessary. A removable medium 111, such as a magnetic disk, an optical disc, a magneto-optical disk, or a semiconductor memory, is appropriately loaded into the drive 110. Computer programs read out from the removable medium 111 is installed in the storage unit 108, if necessary.

When the software executes the series of processes, the programs in the software are installed in a computer incorporated in dedicated hardware or installed in, for example, a personal computer capable of installing various programs to perform various functions, over a network or from a recording medium.

The recording medium may be the removable medium 111, such as a magnetic disk (including a flexible disk), an optical disk (including a compact disk-read only memory (CD-ROM) and a digital versatile disk (DVD), a magneto-optical disk (including a MiniDisc (Registered Trademark of Sony Corporation) (MD), or a semiconductor memory, which is separated from the apparatus, which is delivered in order to provide the programs to a user, and in which the programs are recorded, as shown in FIG. 19. Alternatively, the recording medium may be the ROM 102, which is provided to the user with being incorporated in the apparatus and in which the programs are recorded, or may be a hard disk included in the storage unit 108.

The steps in this specification may be performed in time series in the described order or may be performed in parallel or individually.

The system represents the entire system including multiple apparatuses in this specification.

It should be understood by those skilled in the art that various modifications, combinations, sub-combinations and alterations may occur depending on design requirements and other factors insofar as they are within the scope of the appended claims or the equivalents thereof.

What is claimed is:

1. A data transmission-reception system comprising:
a reader-writer;
a first contactless IC chip, which is a data source; and
a second contactless IC chip, which is a data destination and which is capable of communication with the first contactless IC chip via the reader-writer,
wherein the first and second contactless IC chips each have data areas of the same applications in memories built therein,
wherein the first contactless IC chip includes
first generating means for performing authentication with the second contactless IC chip by the use of data encrypted with a key generated by combining keys allocated to the data areas in which data to be transferred is managed to generate a transfer key used for encrypting the data to be transferred; and transmitting means for encrypting the data to be transferred with the transfer key generated by the first generating means and transmitting the encrypted data to be transferred to the second contactless IC chip, and wherein the second contactless IC chip includes second generating means for performing authentication with the first contactless IC chip by the use of data encrypted with a key generated by combining keys allocated to the data areas in which the data to be transferred is managed and which have the same applications as the data areas in the first contactless IC chip to generate a transfer key equivalent to the one generated in the first contactless IC chip; and acquiring means for decrypting the data to be transferred, which is transferred from the first contactless IC chip and which is encrypted with the transfer key generated by the first generating means, with the transfer key generated by the second generating means to acquire the data to be transferred.

2. A contactless IC chip that is a data source for another contactless IC chip capable of communication via a reader-writer and that has data areas, having the same applications as data areas in a memory built in the other contactless IC chip, in a memory built in the contactless IC chip, the contactless IC chip comprising:

generating means for performing authentication with the other contactless IC chip by the use of data encrypted with a key generated by combining keys allocated to the data areas in which data to be transferred is managed to generate a transfer key used for encrypting the data to be transferred; and transmitting means for encrypting the data to be transferred with the transfer key generated by the generating means and transmitting the encrypted data to be transferred to the other contactless IC chip.

3. The contactless IC chip according to claim 2, wherein the generating means selects all the systems formed in the built-in memory as the data areas in which the data to be transferred is managed and uses data encrypted with a key generated by combining keys allocated to all the selected systems with keys allocated to predetermined areas, among lower-layer areas in the respective systems, to perform the authentication with the other contactless IC chip.

4. The contactless IC chip according to claim 2, wherein the generating means selects a predetermined system, among all the systems formed in the built-in memory, as the data area in which the data to be transferred is managed and uses data encrypted with a key generated by combining a key allocated to the selected predetermined system with a key allocated to a predetermined area, among lower-layer areas in the predetermined system, to perform the authentication with the other contactless IC chip.

5. An information processing method for a contactless IC chip that is a data source for another contactless IC chip capable of communication via a reader-writer and that has data areas, having the same applications as data areas in a memory built in the other contactless IC chip, in a memory built in the contactless IC chip, the information processing method comprising the steps of:

performing authentication with the other contactless IC chip by the use of data encrypted with a key generated by combining keys allocated to the data areas in which data to be transferred is managed to generate a transfer key used for encrypting the data to be transferred; and encrypting the data to be transferred with the generated transfer key and transmitting the encrypted data to be transferred to the other contactless IC chip.

6. A program causing a computer to perform information processing for a contactless IC chip that is a data source for another contactless IC chip capable of communication via a reader-writer and that has data areas, having the same applications as data areas in a memory built in the other contactless IC chip, in a memory built in the contactless IC chip, the program comprising:

instructions for performing authentication with the other contactless IC chip by the use of data encrypted with a key generated by combining keys allocated to the data areas in which data to be transferred is managed to generate a transfer key used for encrypting the data to be transferred; and instructions for encrypting the data to be transferred with the generated transfer key and transmitting the encrypted data to be transferred to the other contactless IC chip.

7. A mobile terminal including a contactless IC chip that is a data source for another contactless IC chip capable of communication via a reader-writer and that has data areas, having the same applications as data areas in a memory built in the other contactless IC chip, in a memory built in the contactless IC chip, the contactless IC chip comprising:

generating means for performing authentication with the other contactless IC chip by the use of data encrypted with a key generated by combining keys allocated to the data areas in which data to be transferred is managed to generate a transfer key used for encrypting the data to be transferred; and transmitting means for encrypting the data to be transferred with the generated transfer key and transmitting the encrypted data to be transferred to the other contactless IC chip.

8. A contactless IC chip that is a data source for another contactless IC chip capable of communication via a reader-writer and that has data areas, having the same applications as data areas in a memory built in the other contactless IC chip, in a memory built in the contactless IC chip, the contactless IC chip comprising:

generating means for performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred; and acquiring means for decrypting the encrypted data to be transferred, which is transferred from the other contactless IC chip, with the transfer key generated by the generating means to acquire the data to be transferred.

9. An information processing method for a contactless IC chip that is a data source for another contactless IC chip capable of communication via a reader-writer and that has data areas, having the same applications as data areas in a memory built in the other contactless IC chip, in a memory built in the contactless IC chip, the information processing method comprising the steps of:

performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred; and decrypting the encrypted data to be transferred, which is transferred from the other contactless IC chip, with the generated transfer key to acquire the data to be transferred.

10. A program causing a computer to perform information processing for a contactless IC chip that is a data source for another contactless IC chip capable of communication via a reader-writer and that has data areas, having the same applications as data areas in a memory built in the other contactless IC chip, in a memory built in the contactless IC chip, the program comprising:

instructions for performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred; and instructions for decrypting the encrypted data to be transferred, which is transferred from the other contactless IC chip, with the generated transfer key to acquire the data to be transferred.

11. A mobile terminal including a contactless IC chip that is a data source for another contactless IC chip capable of communication via a reader-writer and that has data areas, having the same applications as data areas in a memory built in the other contactless IC chip, in a memory built in the contactless IC chip, the contactless IC chip comprising:

generating means for performing authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred; and acquiring means for decrypting the encrypted data to be transferred, which is transferred from the other contactless IC chip, with the generated transfer key to acquire the data to be transferred.

12. A contactless IC chip that is a data source for another contactless IC chip capable of communication via a reader-writer and that has data areas, having the same applications as data areas in a memory built in the other contactless IC chip, in a memory built in the contactless IC chip, the contactless IC chip comprising:

a generating unit configured to perform authentication with the other contactless IC chip by the use of data encrypted with a key generated by combining keys allocated to the data areas in which data to be transferred is managed to generate a transfer key used for encrypting the data to be transferred; and a transmitting unit configured to encrypt the data to be transferred with the transfer key generated by the generating means and to transmit the encrypted data to be transferred to the other contactless IC chip.

13. A contactless IC chip that is a data source for another contactless IC chip capable of communication via a reader-writer and that has data areas, having the same applications as data areas in a memory built in the other contactless IC chip, in a memory built in the contactless IC chip, the contactless IC chip comprising:

a generating unit configured to perform authentication with the other contactless IC chip by the use of data encrypted with a key generated by combining keys allocated to the data areas in which data to be transferred is managed and which have the same applications as the data areas in the other contactless IC chip to generate a transfer key equivalent to the one that is generated in the other contactless IC chip and that is used in the encryption of the data to be transferred; and an acquiring unit configured to decrypt the encrypted data to be transferred, which is transferred from the other contactless IC chip, with the transfer key generated by the generating means to acquire the data to be transferred.

* * * * *